United States Patent
Fujioka

(10) Patent No.: US 8,489,577 B2
(45) Date of Patent: Jul. 16, 2013

(54) SYSTEM AND METHOD FOR DEFINED SEARCHING AND WEB CRAWLING

(75) Inventor: Robb Fujioka, Manhattan Beach, CA (US)

(73) Assignee: Fuhu Holdings, Inc., El Segundo, CA (US)

( * ) Notice: Subject to any disclaimer, the term of this patent is extended or adjusted under 35 U.S.C. 154(b) by 31 days.

(21) Appl. No.: 12/709,839

(22) Filed: Feb. 22, 2010

(65) Prior Publication Data

US 2010/0217757 A1 Aug. 26, 2010

Related U.S. Application Data

(63) Continuation-in-part of application No. 12/381,905, filed on Mar. 17, 2009, now Pat. No. 8,463,764, and a continuation-in-part of application No. 12/381,666, filed on Mar. 12, 2009.

(60) Provisional application No. 61/208,277, filed on Feb. 20, 2009, provisional application No. 61/069,775, filed on Mar. 17, 2008, provisional application No. 61/070,942, filed on Mar. 26, 2008.

(51) Int. Cl.
    *G06F 17/30* (2006.01)
(52) U.S. Cl.
    USPC ........... 707/709; 707/712; 707/722; 707/736; 707/758; 707/781

(58) Field of Classification Search
    USPC . 715/764; 705/14.67; 709/218; 707/600–899
    See application file for complete search history.

(56) References Cited

U.S. PATENT DOCUMENTS

| | | | |
|---|---|---|---|
| 2006/0235873 A1* | 10/2006 | Thomas | 707/102 |
| 2006/0288087 A1* | 12/2006 | Sun | 709/218 |
| 2007/0078718 A1* | 4/2007 | Gorodyansky | 705/14 |
| 2007/0150603 A1* | 6/2007 | Crull et al. | 709/227 |
| 2008/0097975 A1* | 4/2008 | Guay et al. | 707/4 |
| 2008/0120558 A1* | 5/2008 | Nathan et al. | 715/764 |
| 2008/0201386 A1* | 8/2008 | Maharajh et al. | 707/201 |
| 2009/0006388 A1* | 1/2009 | Ives et al. | 707/5 |
| 2009/0144639 A1* | 6/2009 | Nims et al. | 715/757 |
| 2009/0249451 A1* | 10/2009 | Su et al. | 726/5 |
| 2010/0023506 A1* | 1/2010 | Sahni et al. | 707/5 |
| 2010/0057772 A1* | 3/2010 | Manolescu et al. | 707/103 R |
| 2011/0022621 A1* | 1/2011 | Luo et al. | 707/769 |

* cited by examiner

*Primary Examiner* — Isaac M Woo
(74) *Attorney, Agent, or Firm* — Marc E. Hankin; Kevin Schraven; Hankin Patent Law, APC

(57) ABSTRACT

A computerized search engine for use in association with one or more networked social sites is disclosed. The computerized search engine includes a widgetized avatar representative of a user of at least two of the networked social sites, a crawler that crawls each of the at least two networked social sites for modification of information related to one or more contacts of the user on at least one of the at least two networked social sites, and a display of search results. The display includes the modified information from the at least two networked social sites.

37 Claims, 52 Drawing Sheets

SYSTEM AND METHOD FOR DEFINED SEARCHING AND WEB CRAWLING

CROSS REFERENCE TO RELATED APPLICATIONS

This application claims priority to U.S. Provisional Patent Application No. 61/208,277, titled "System and Method for Defined Searching and Web Crawling," filed Feb. 20, 2009, the contents of which are expressly incorporated herein by this reference as though set forth in their entirety, and to which priority is claimed. This application is also a continuation-in-part of U.S. Pat. No. 8,463,764, titled "Social Based Search Engine, System and Method," filed Mar. 17, 2009, which claims the benefit of priority to U.S. Provisional Patent Application Ser. No. 61/069,775 titled "Social Based Search Engine, System and Method", filed Mar. 17, 2008, the entire disclosures of which are incorporated by reference herein as if each being set forth in their entirety. This application is also a continuation-in-part of U.S. patent application Ser. No. 12/381,666, titled "Hypervisor and Virtual Machine Ware," filed Mar. 12, 2009, which claims the benefit of priority to U.S. Provisional Patent Application Ser. No. 61/070,942, titled "Hypervisor Virtual Machine Ware", filed Mar. 26, 2008, the entire disclosures of which are incorporated by reference herein as if each being set forth in their entirety.

STATEMENT REGARDING FEDERALLY SPONSORED RESEARCH OR DEVELOPMENT

Not Applicable

BACKGROUND OF THE INVENTION a. Field of the Invention

The instant invention relates to the field of computers, and in particular to allowing for the capture of data based on at least one object from multiple sources.

b. Description of Related Art

Current users of social networks and those with an interest in communicating through more than one social network site are often left to access each discrete site of interest to track the postings of friends and people of interest. Having to monitor each site to track the usage of ones friends can be time consuming and can take away from the time allowed to participate in ones own social network circles. Furthermore, if you have a friend on a network which you are not a member, networking with that friend through that network may be an impossibility, not least because finding a particular user on any one of several hundred social networking sites is impractical. This problem being further exacerbated when a user is looking to find the social networking sites of more than one friend.

Therefore, there exists a need for a method of searching all available social networking sites for a plurality of desired contacts and coherently collecting the location and posting information for those contacts in a single platform to ease accessibility for the user.

BRIEF DESCRIPTION OF THE DRAWINGS

Understanding of the present invention will be facilitated by consideration of the following detailed description of the embodiments of the present invention taken in conjunction with the accompanying drawings, in which like numerals refer to like parts and in which.

DETAILED DESCRIPTION OF THE INVENTION

It is to be understood that the figures and descriptions of the present invention have been simplified to illustrate elements that are relevant for a clear understanding of the present invention, while eliminating, for the purpose of clarity, many other elements found in typical computer systems. Those of ordinary skill in the art will recognize that other elements and/or steps are desirable and/or required in implementing the present invention. However, because such elements and steps are well known in the art, and because they do not facilitate a better understanding of the present invention, a discussion of such elements and steps is not provided herein. The disclosure herein is directed to all such variations and modifications to such elements and methods known to those skilled in the art. Furthermore, the embodiments identified and illustrated herein are for exemplary purposes only, and are not meant to be exclusive or limited in their description of the present invention.

Figure 1:
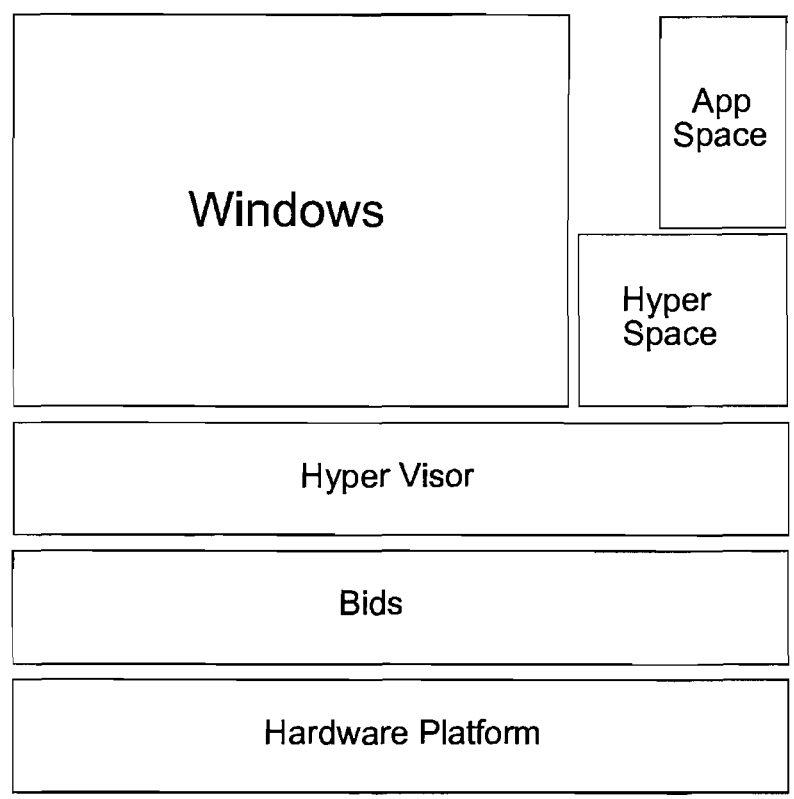
FIG. 1 is a block diagram illustrating the hypervisor and virtual machine ware of the present invention.
Figure 2:
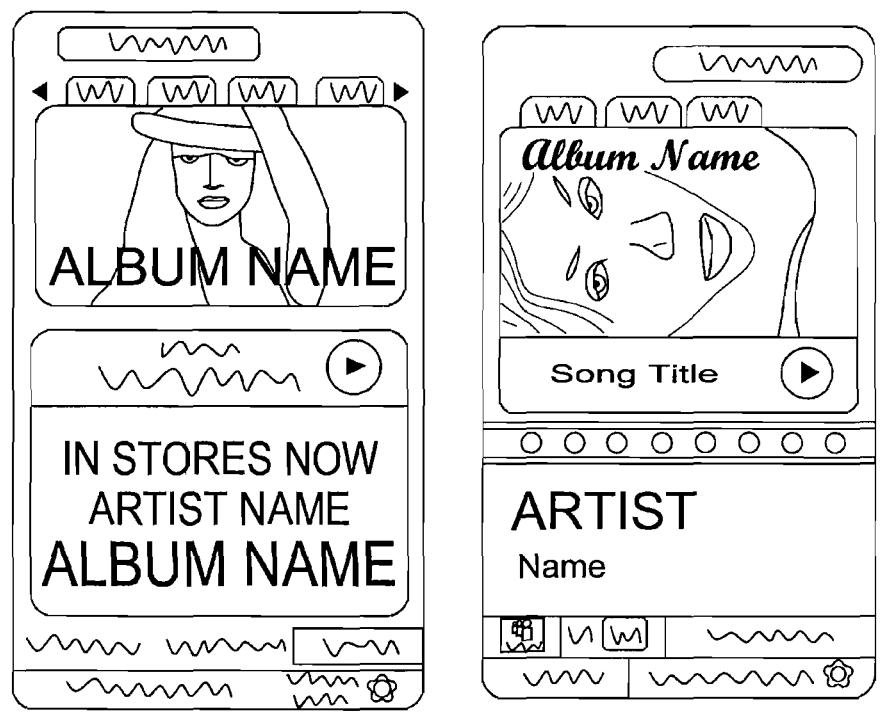
FIG. 2 illustrates an aspect of the present invention.
Figure 3:
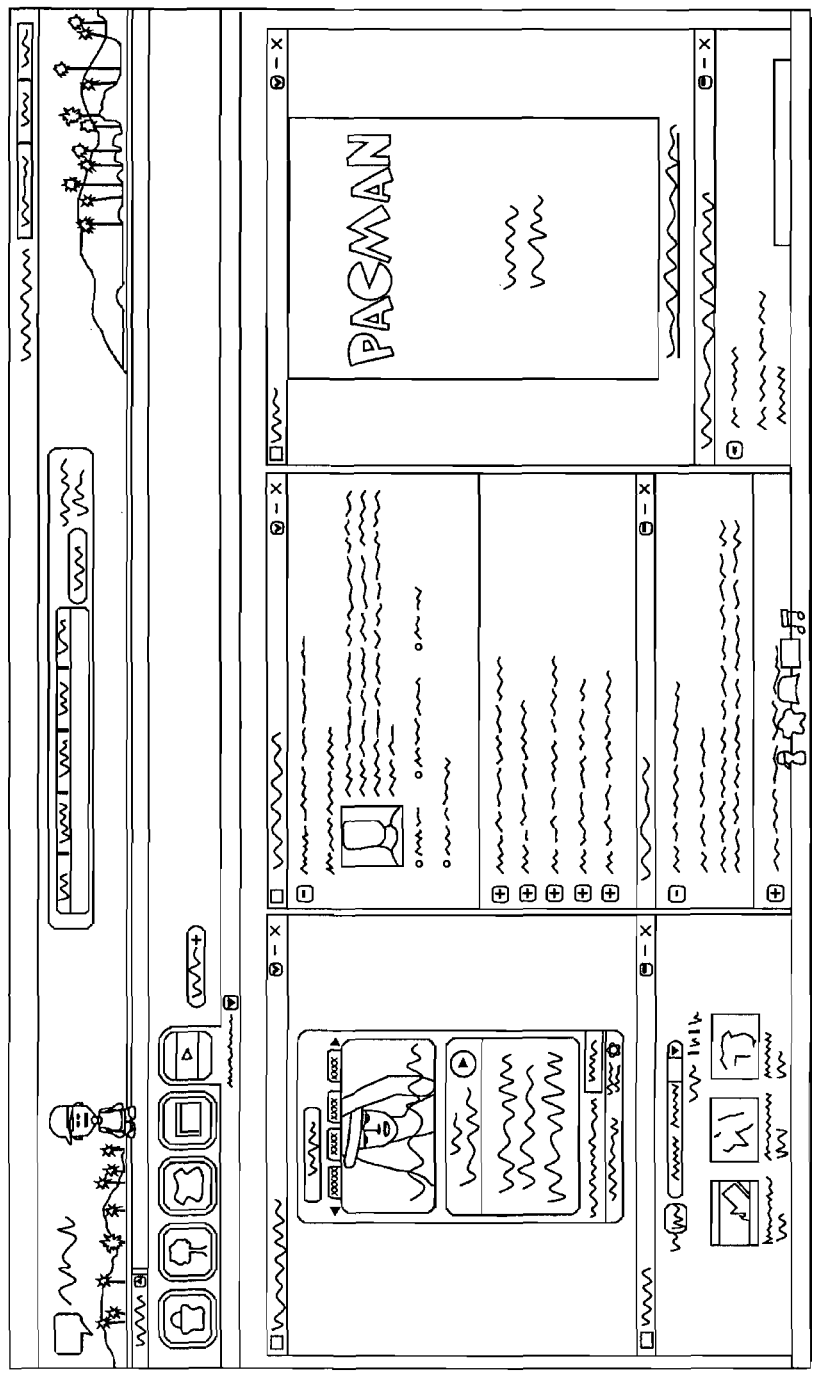
FIG. 3 illustrates an aspect of the present invention.
Figure 4:
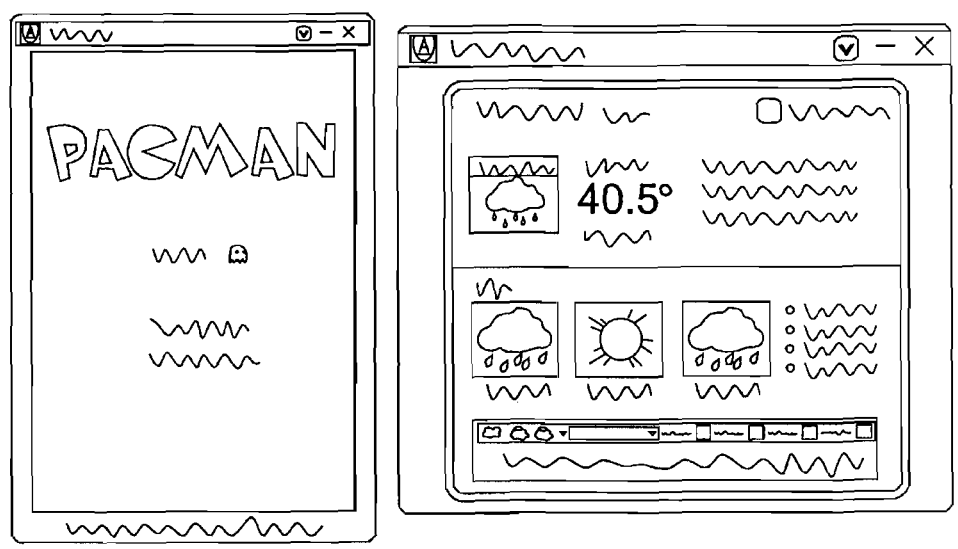
FIG. 4 illustrates an aspect of the present invention.
Figure 5:
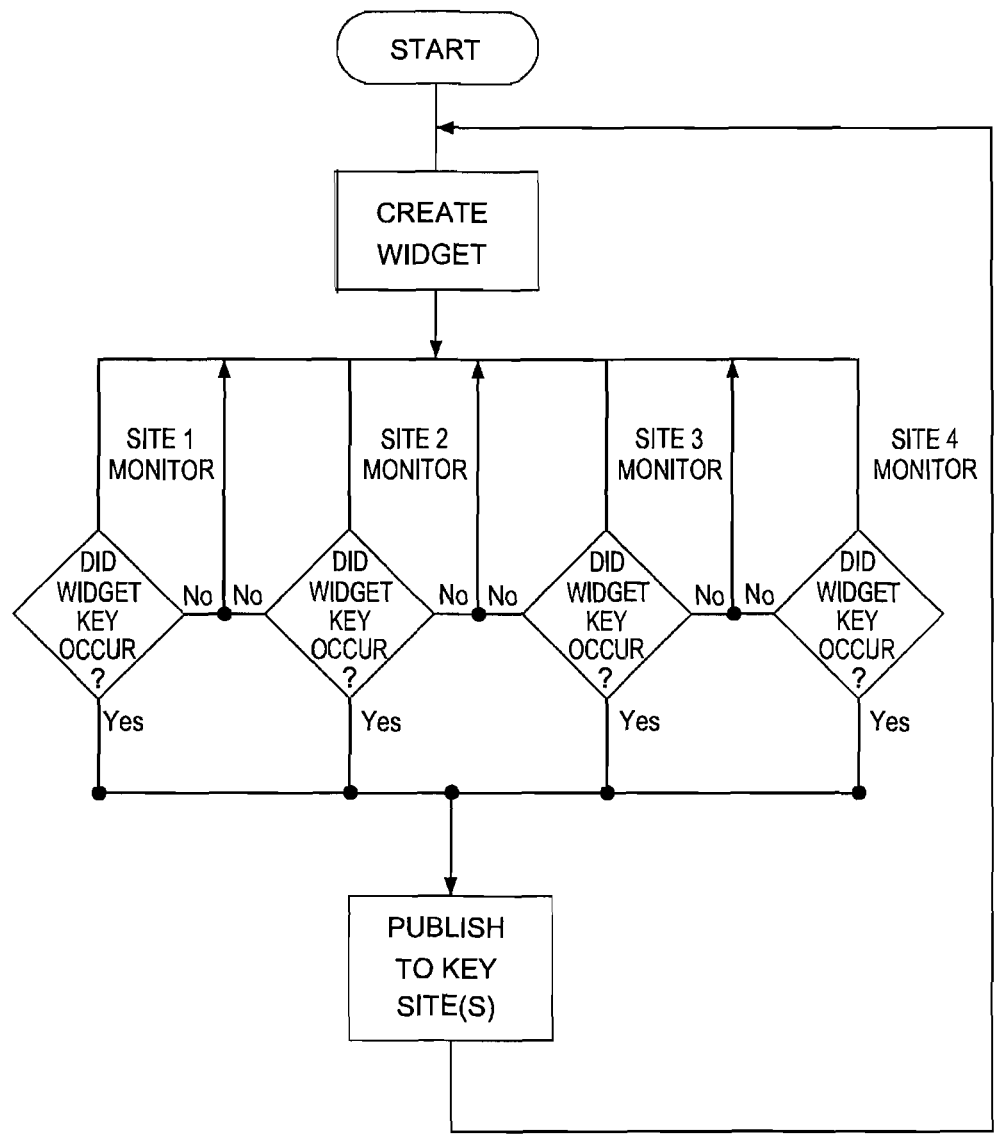
FIG. 5 is a flow diagram illustrating an aspect of the present invention.
Figure 6:
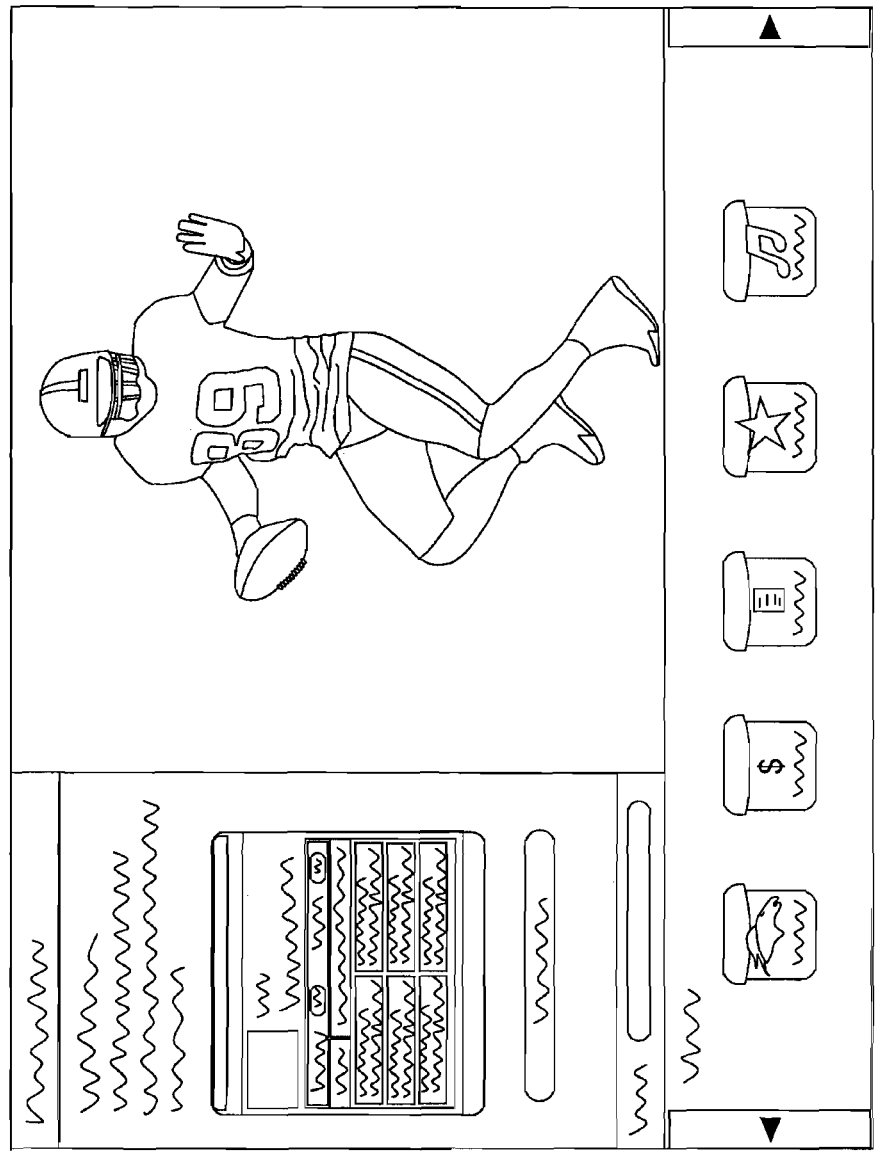
FIG. 6 illustrates an aspect of the present invention.
Figure 7:
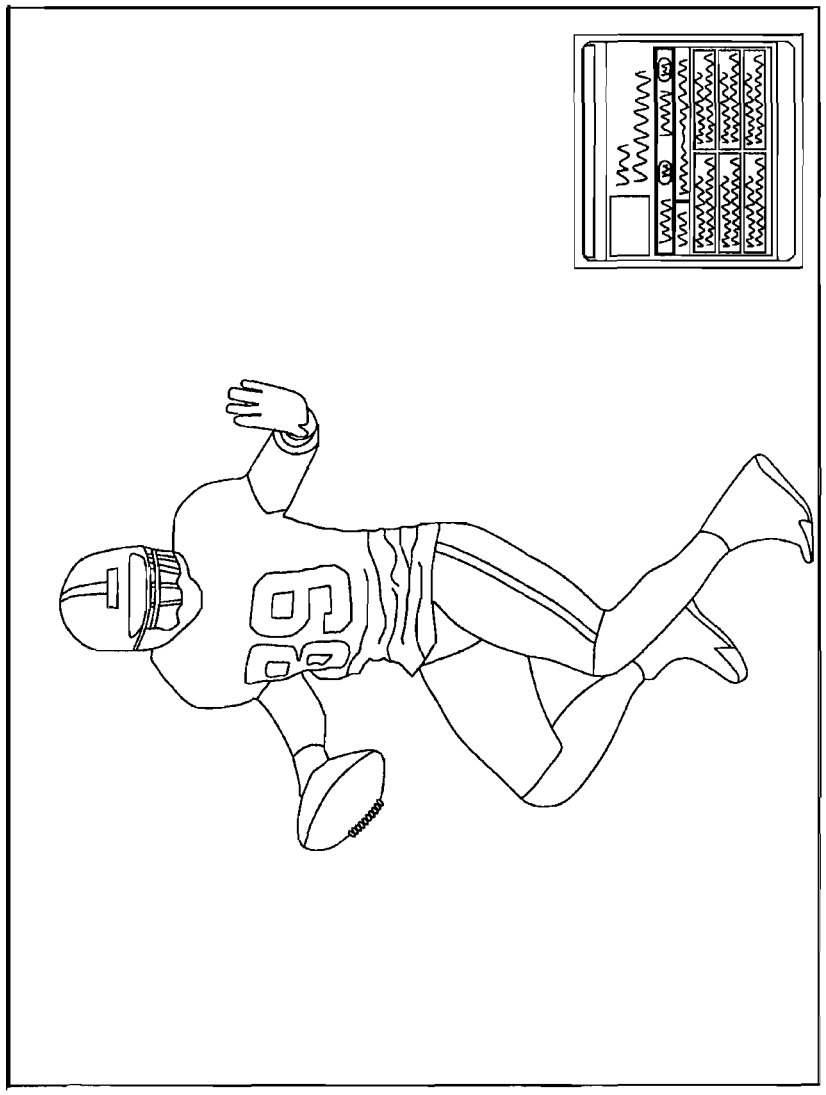
FIG. 7 illustrates an aspect of the present invention.
Figure 8:
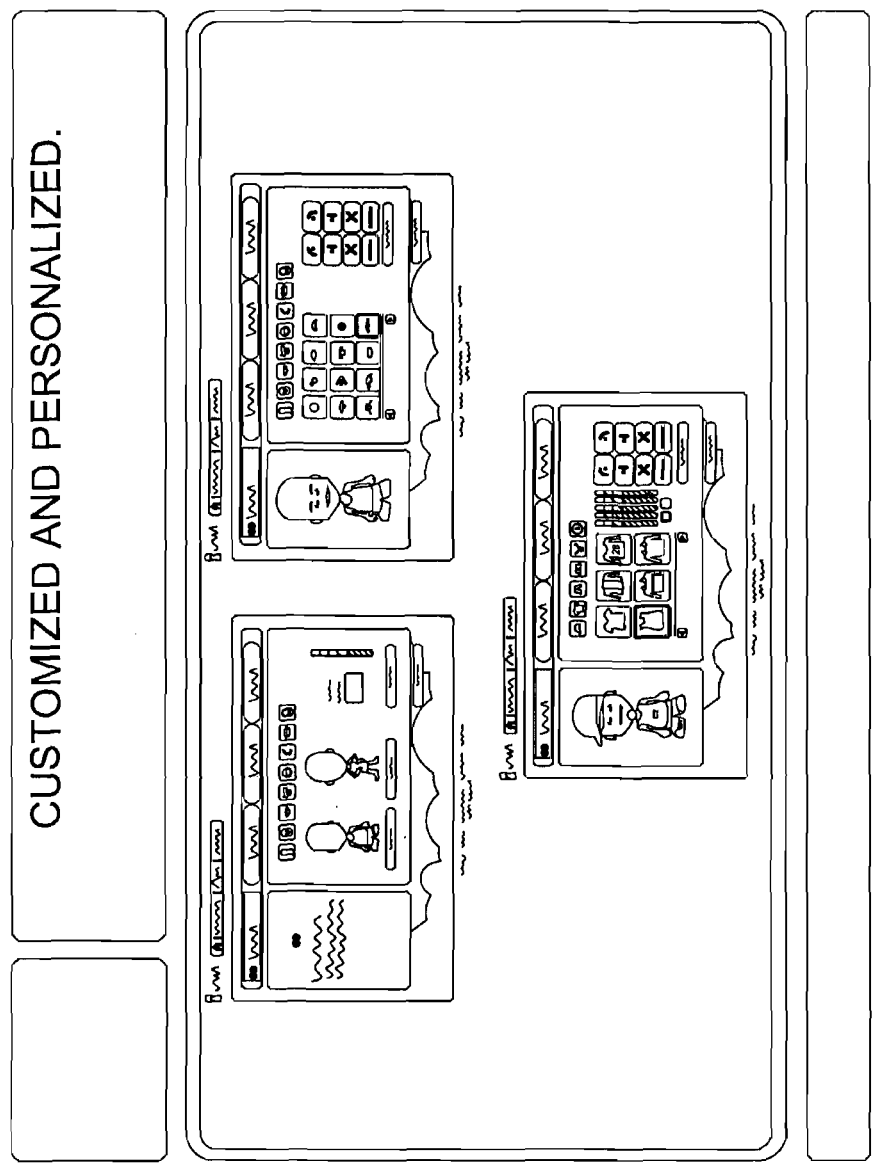
FIG. 8 illustrates an aspect of the present invention.
Figure 9:
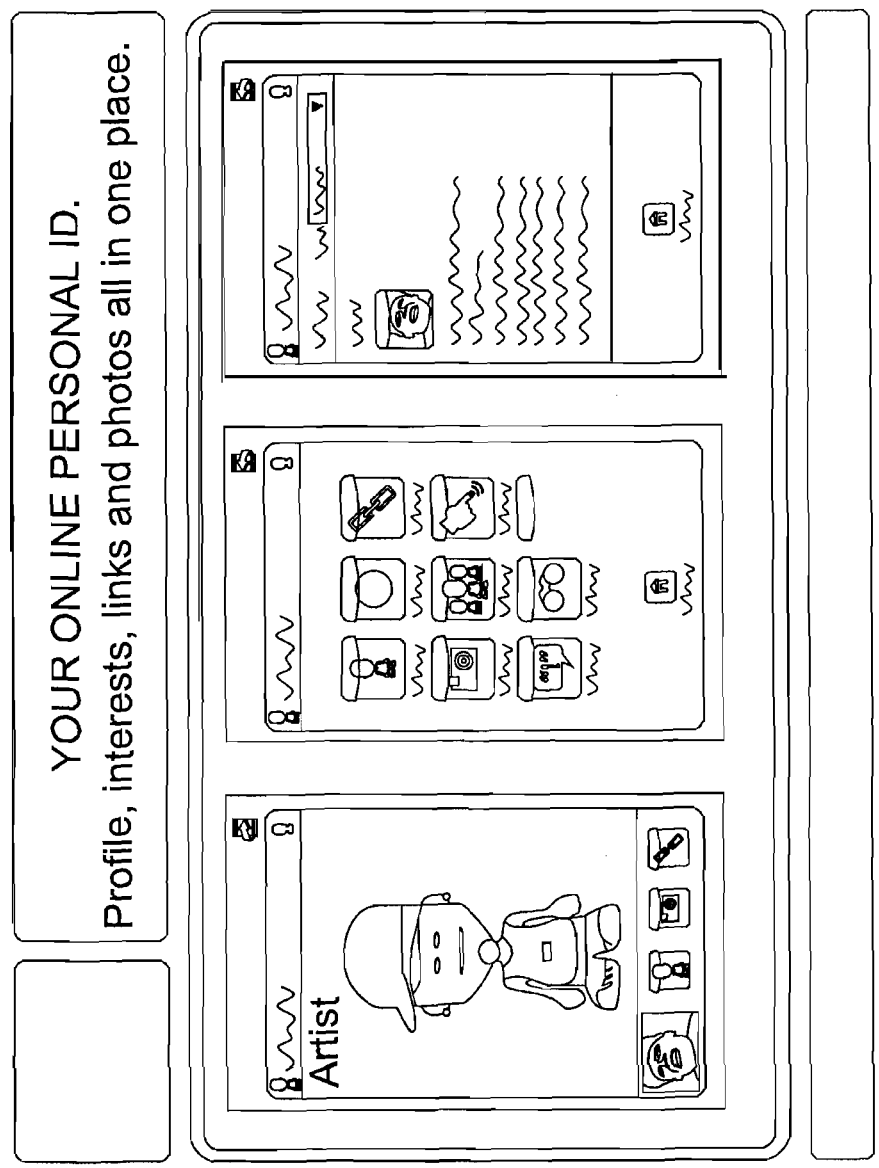
FIG. 9 illustrates an aspect of the present invention.
Figure 10:
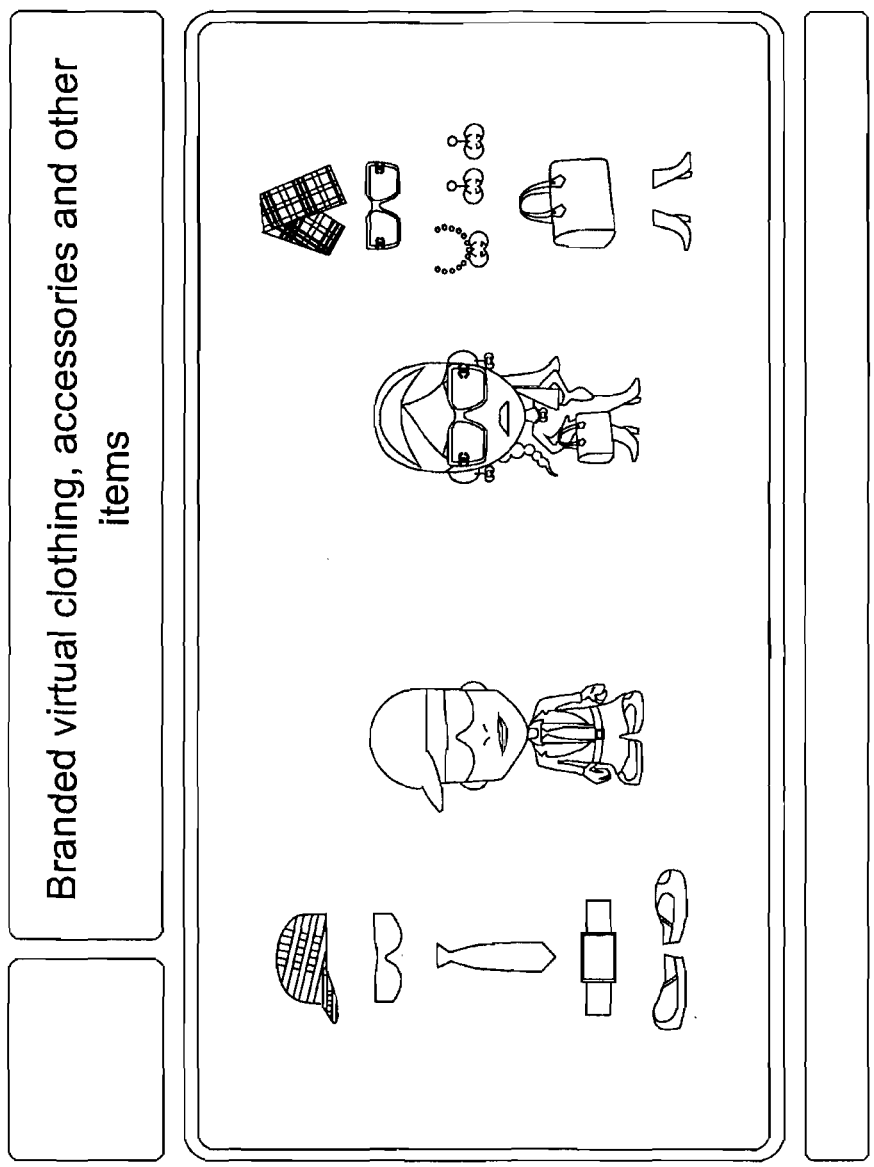
FIG. 10 illustrates an aspect of the present invention.
Figure 11:
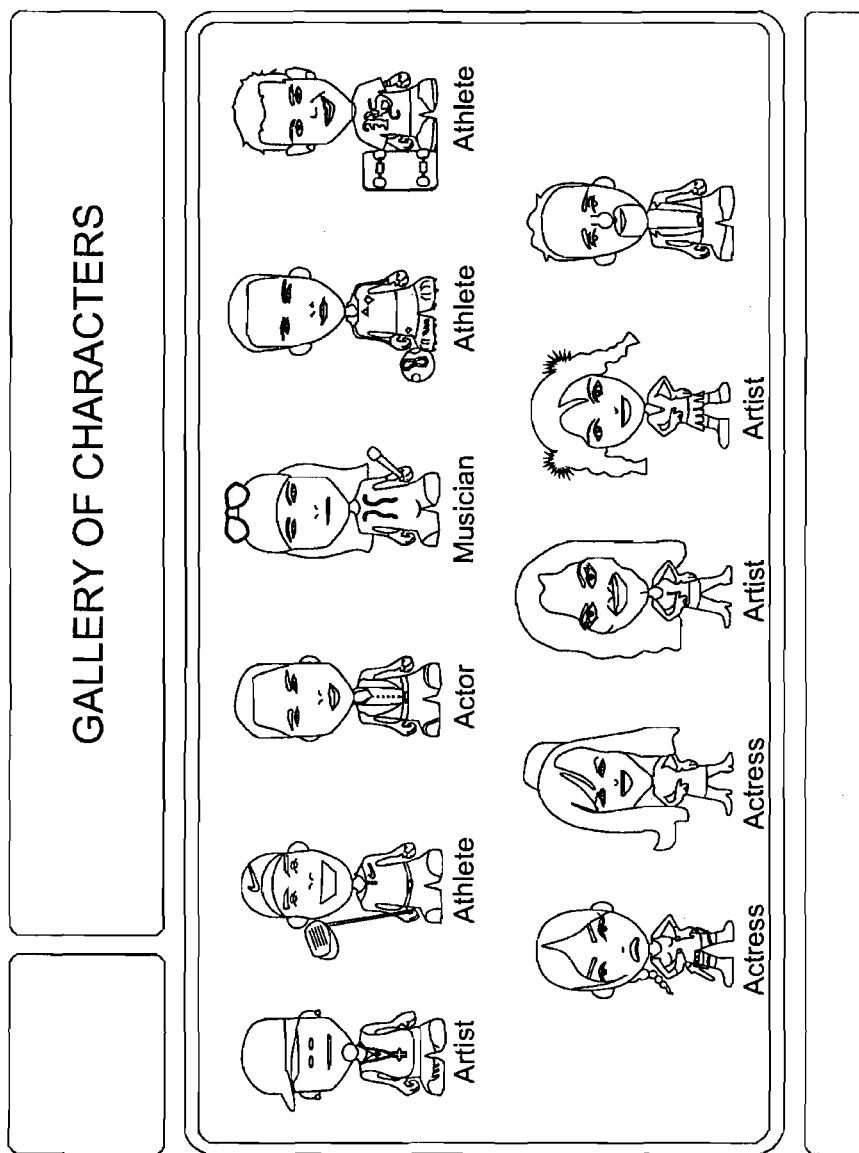
FIG. 11 illustrates an aspect of the present invention.
Figure 12:
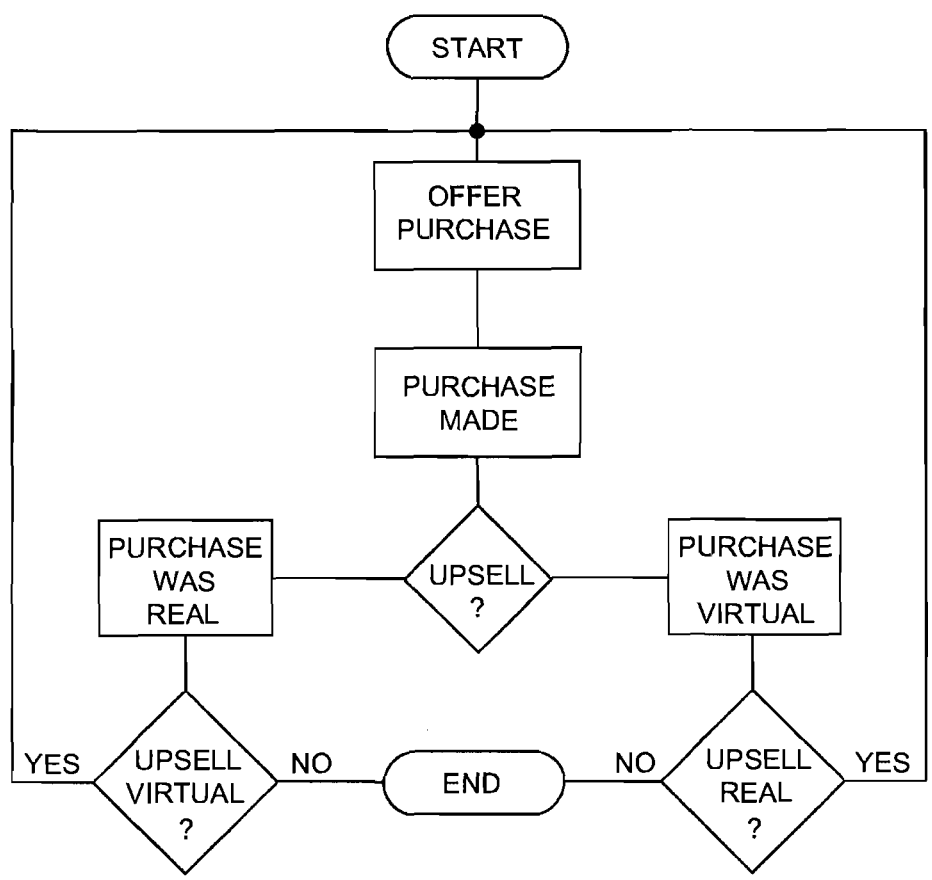
FIG. 12 is a flow diagram illustrating an aspect of the present invention.
Figure 13:
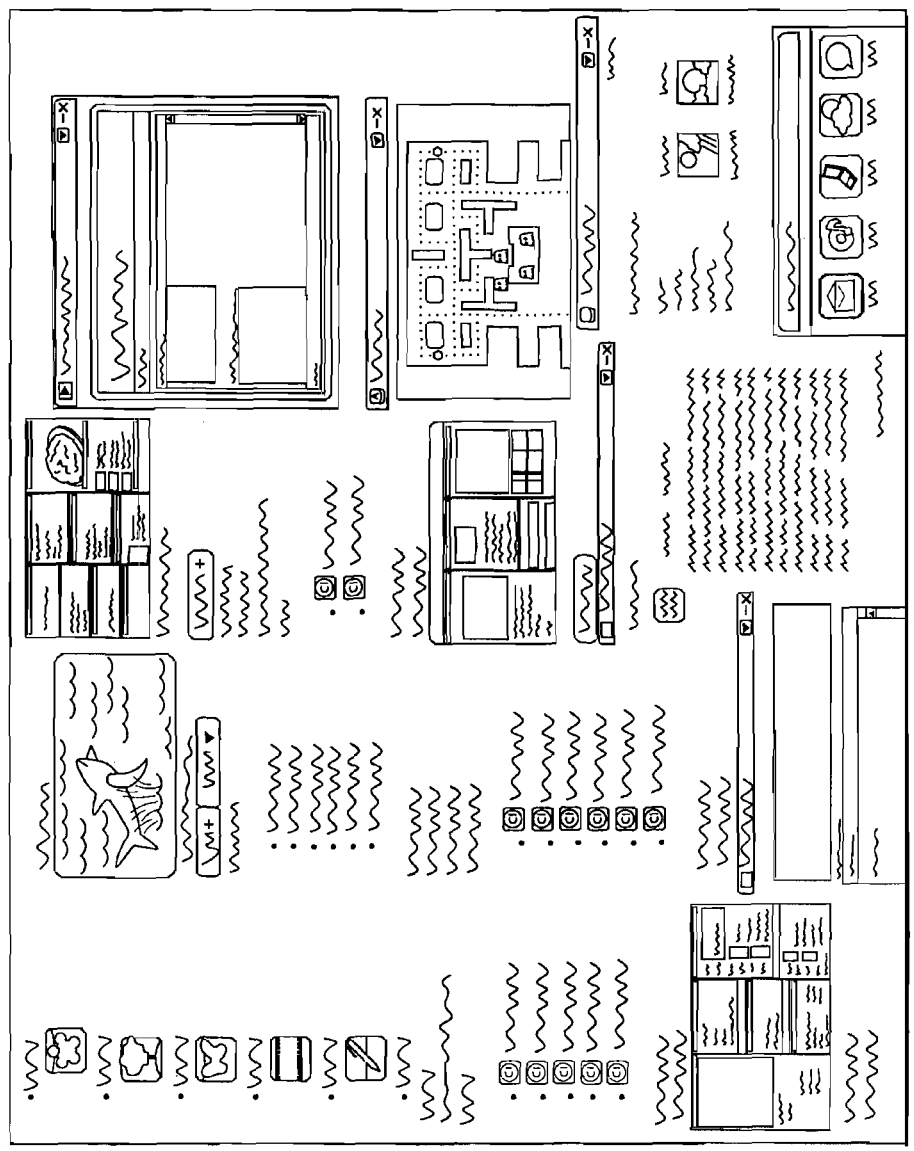
FIG. 13 illustrates an aspect of the present invention.
Figure 14:
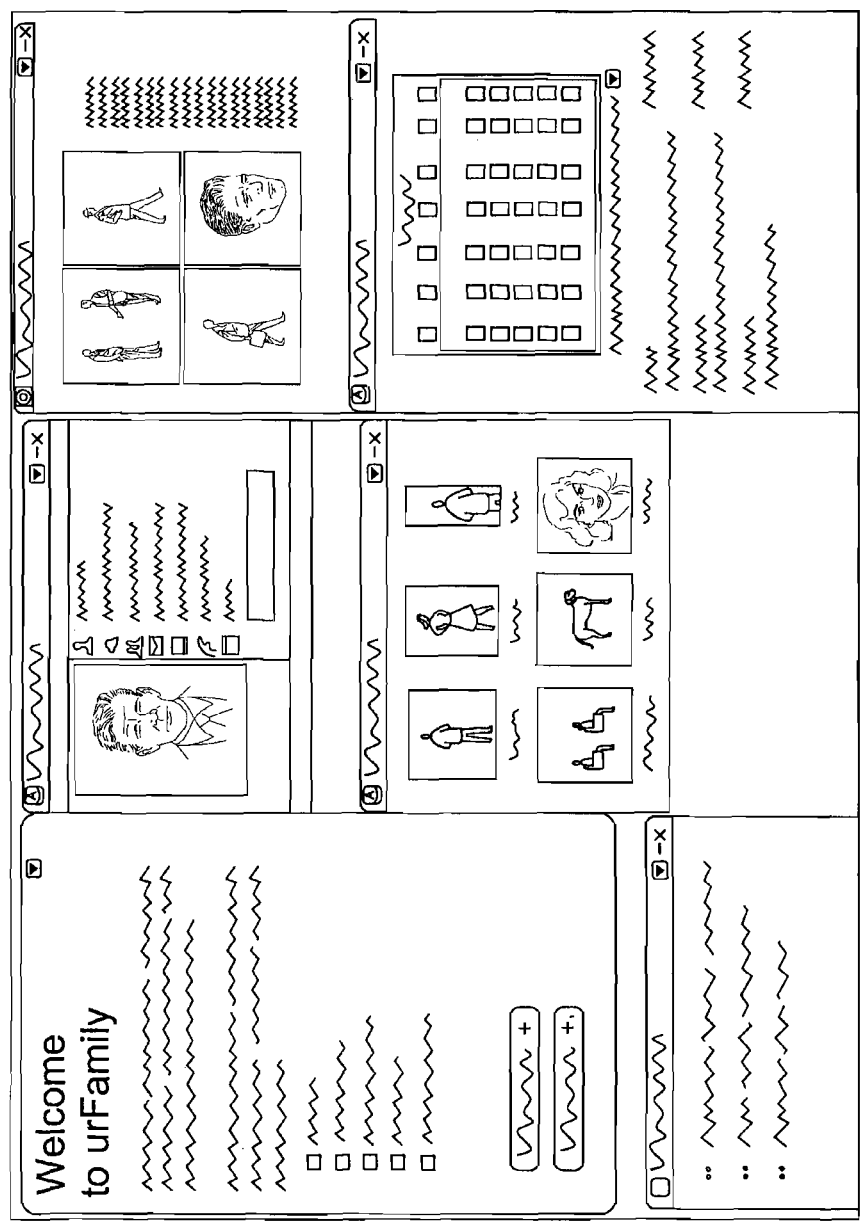
FIG. 14 illustrates an aspect of the present invention.
Figure 15:
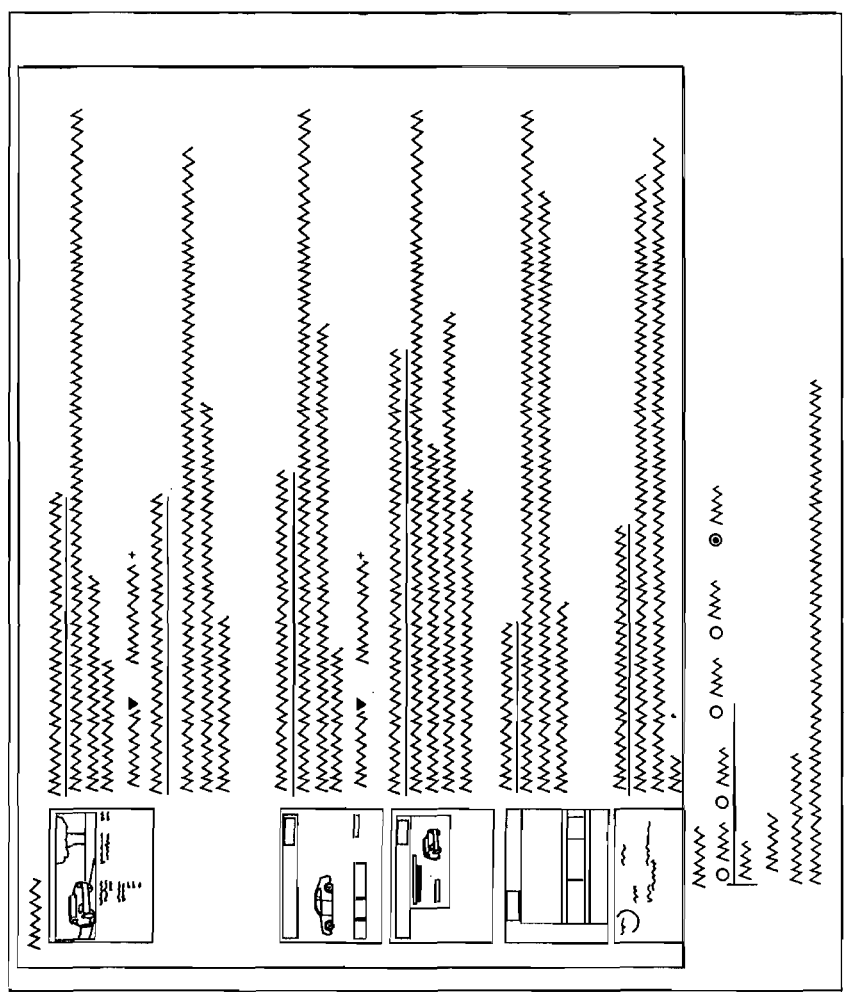
FIG. 15 illustrates an aspect of the present invention.
Figure 16:
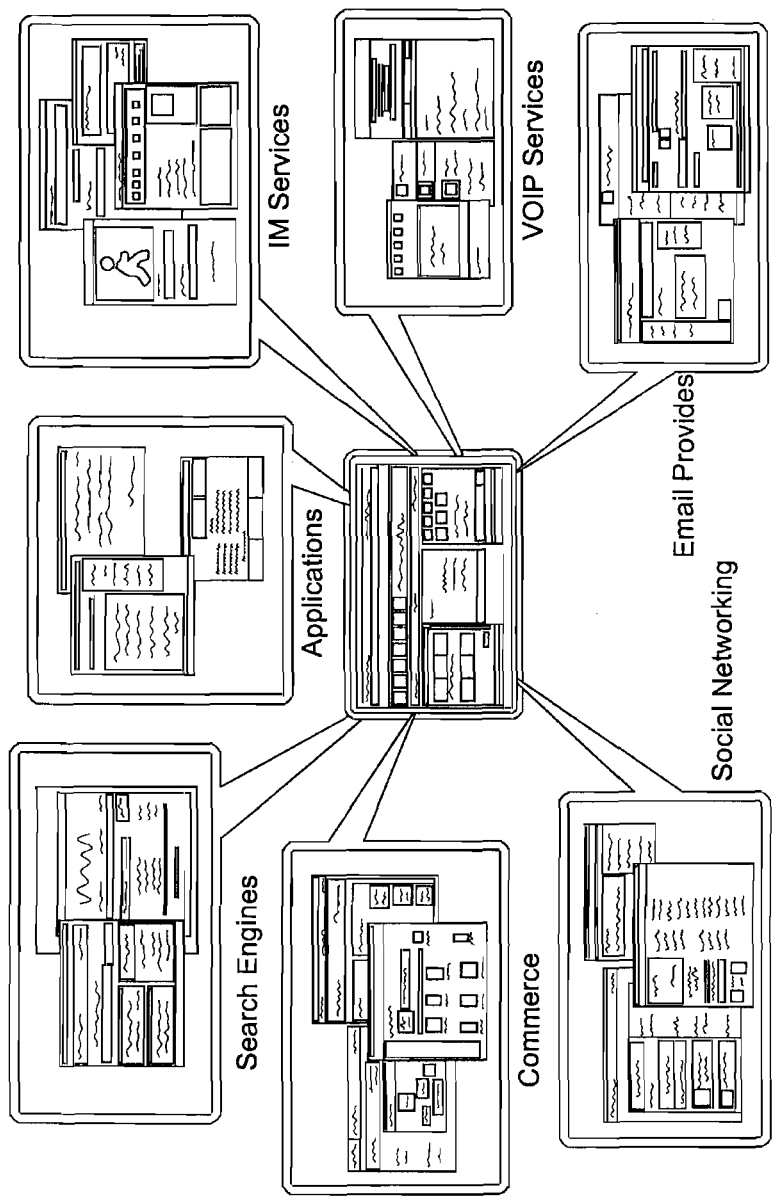
FIG. 16 is a flow diagram illustrating an aspect of the present invention.
Figure 17:
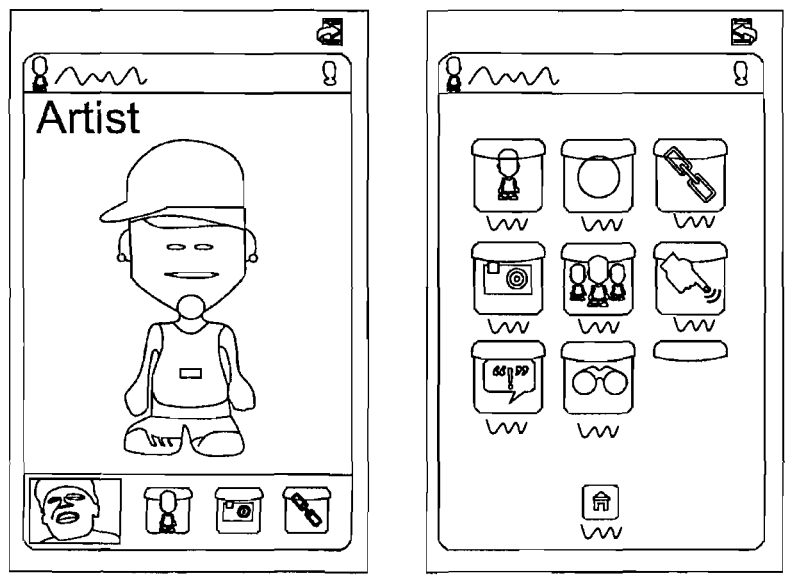
FIG. 17 illustrates an aspect of the present invention.
Figure 18:
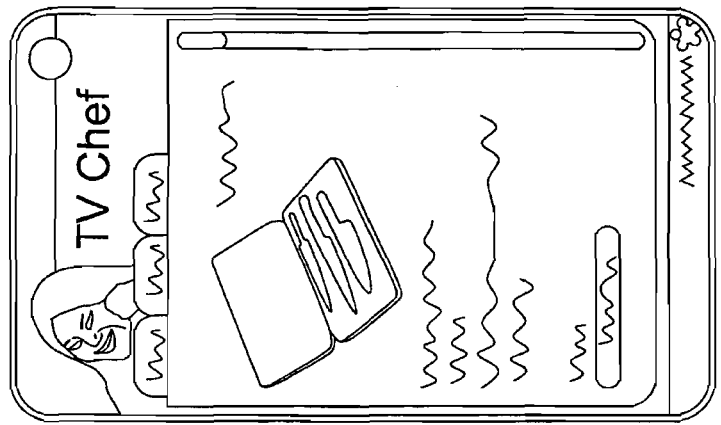
FIG. 18 illustrates an aspect of the present invention.
Figure 18:
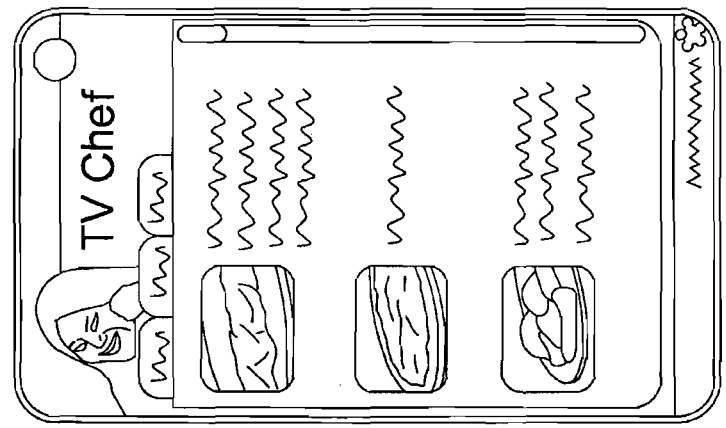
Figure 18:
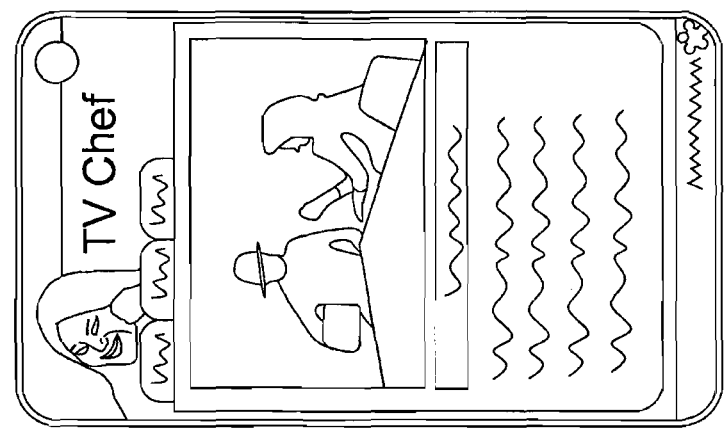
Figure 19:
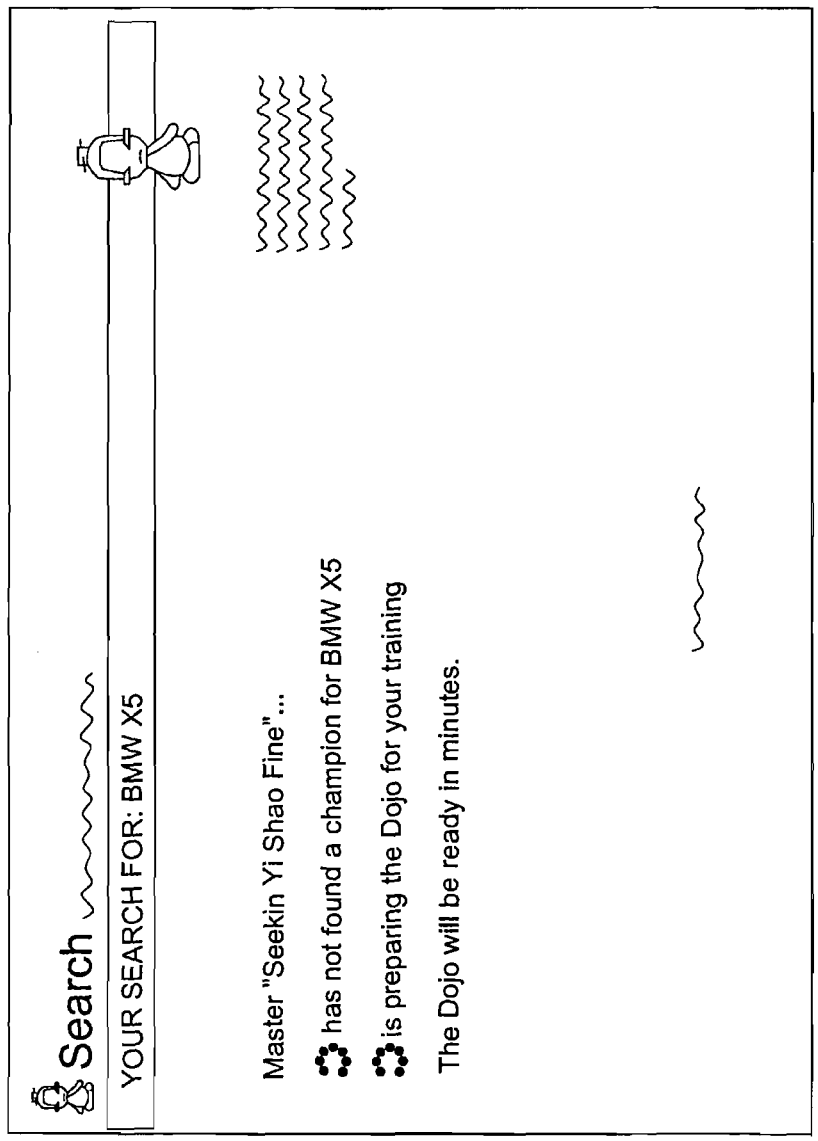
FIG. 19 illustrates an aspect of the present invention.
Figure 20:
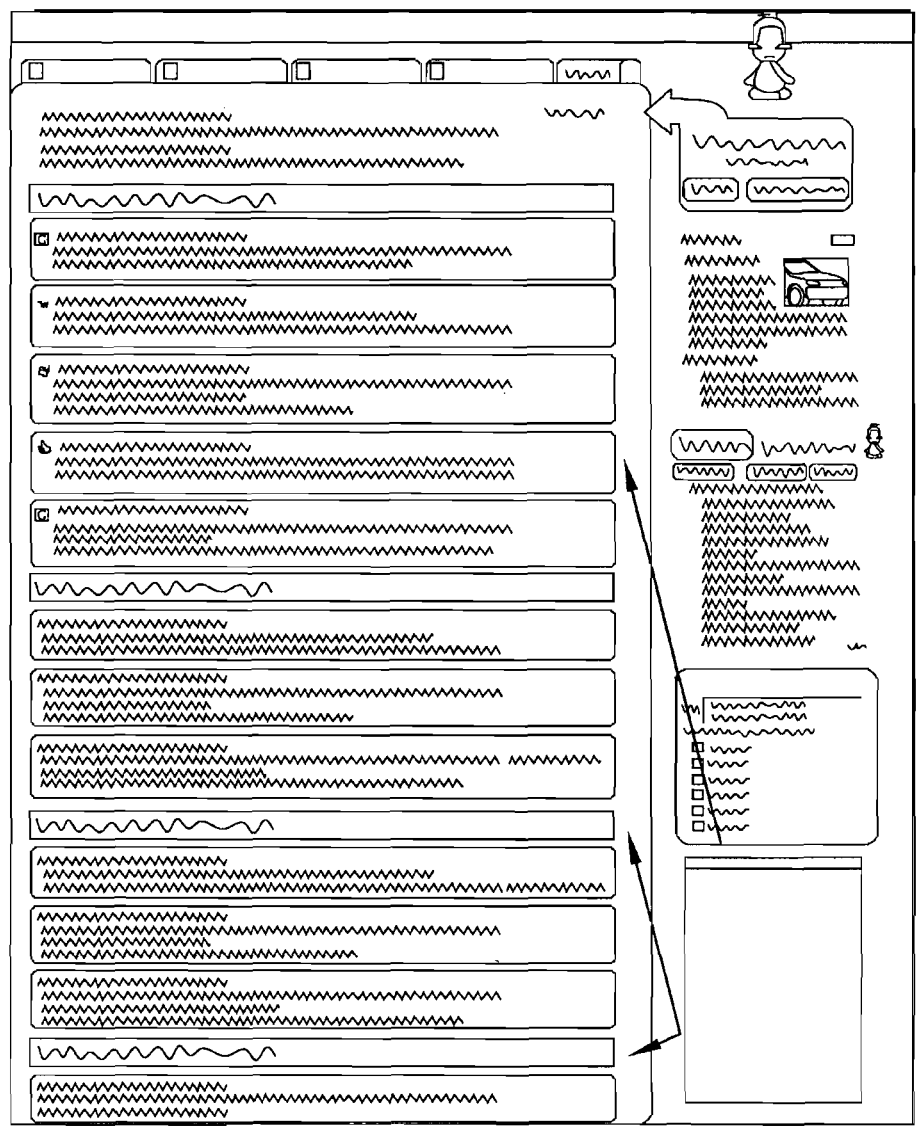
FIG. 20 illustrates an aspect of the present invention.
Figure 21:
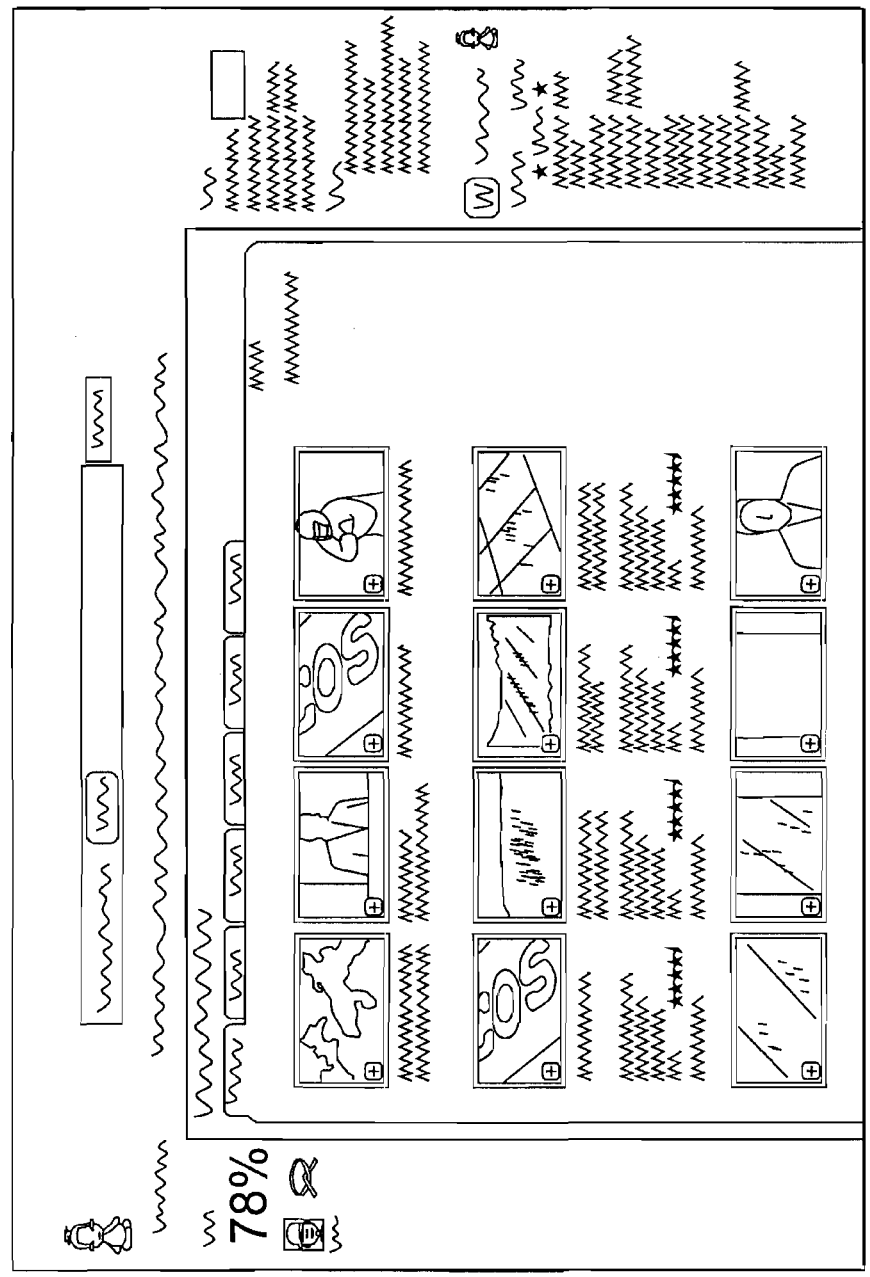
FIG. 21 illustrates an aspect of the present invention.
Figure 22:
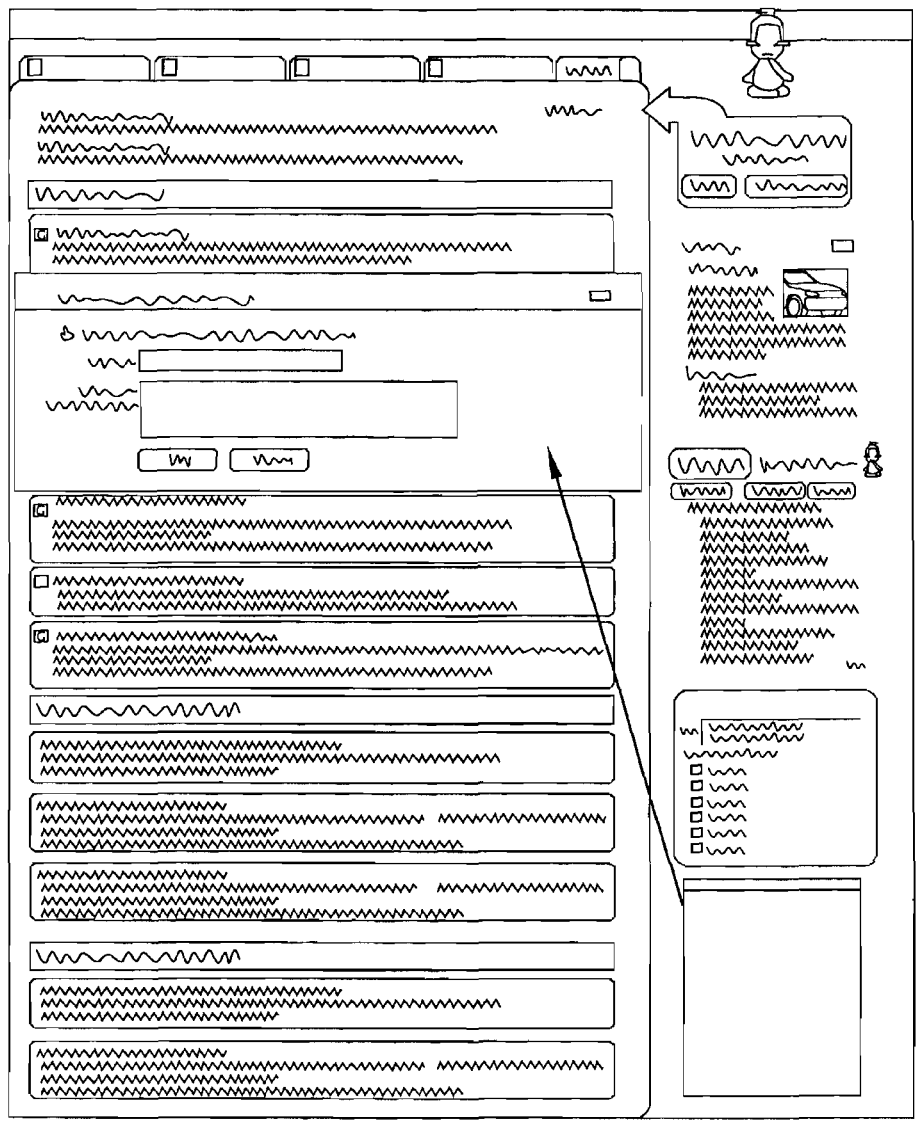
FIG. 22 illustrates an aspect of the present invention.
Figure 23:
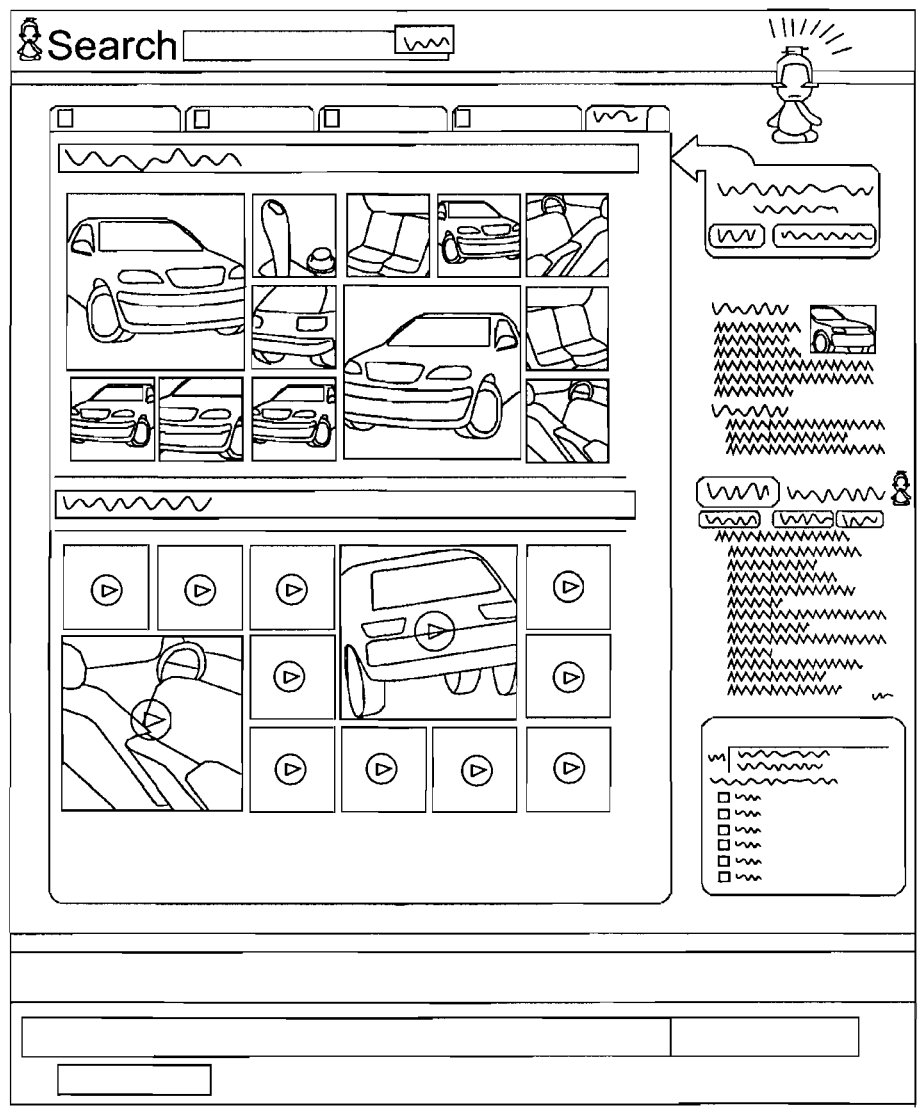
FIG. 23 illustrates an aspect of the present invention.
Figure 24:
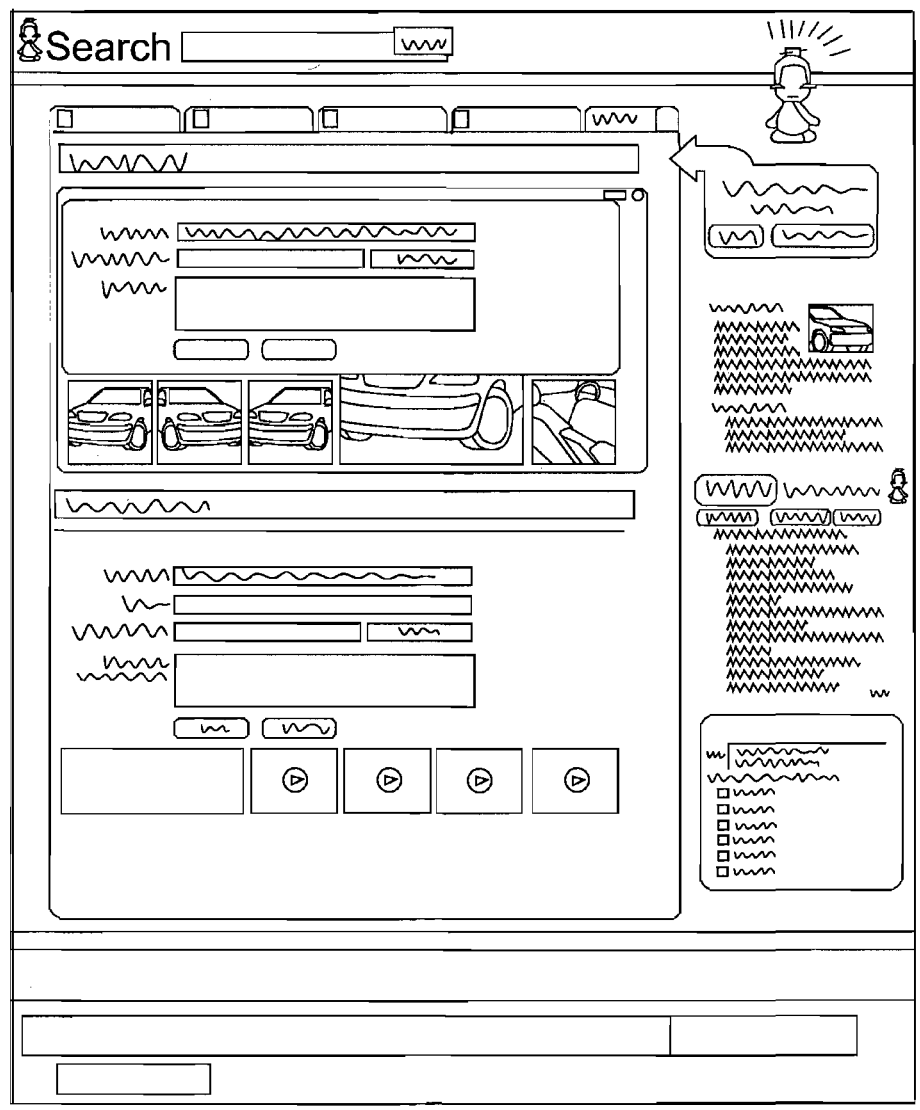
FIG. 24 illustrates an aspect of the present invention.
Figure 25:
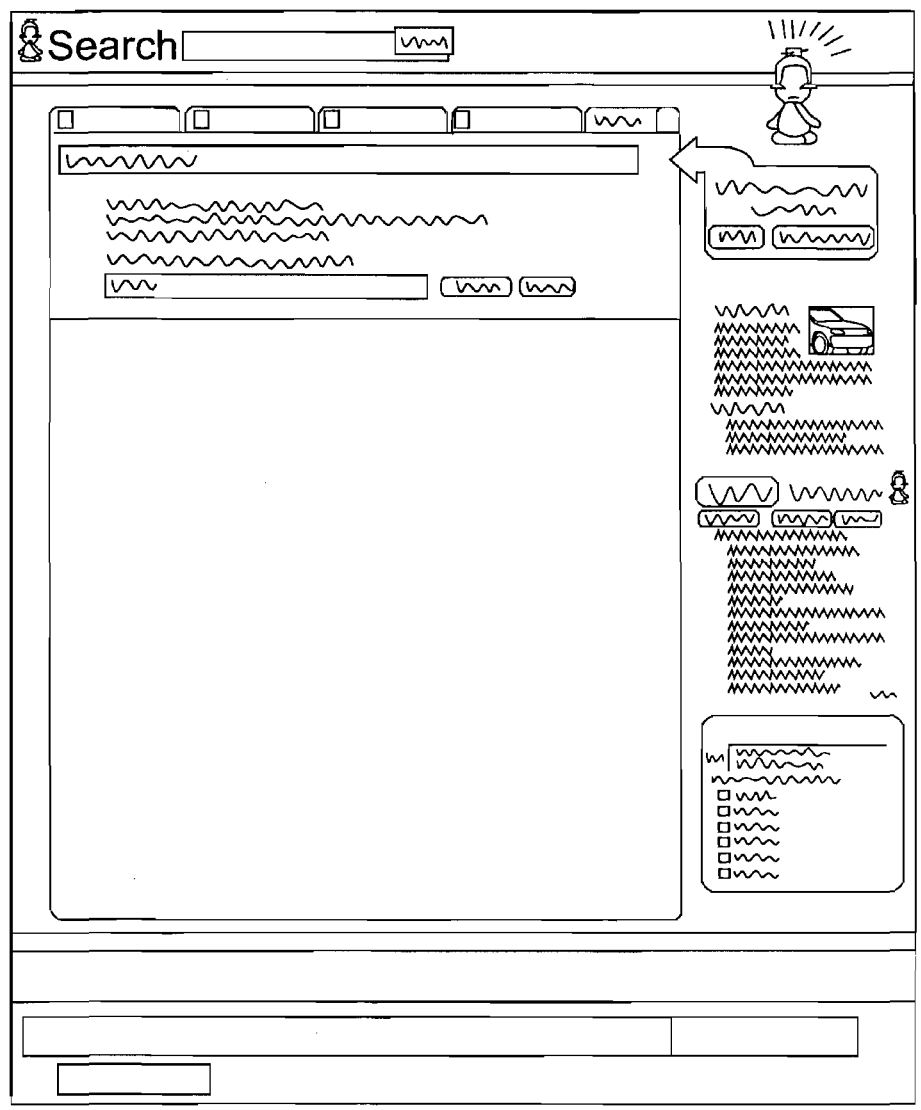
FIG. 25 illustrates an aspect of the present invention.
Figure 26:
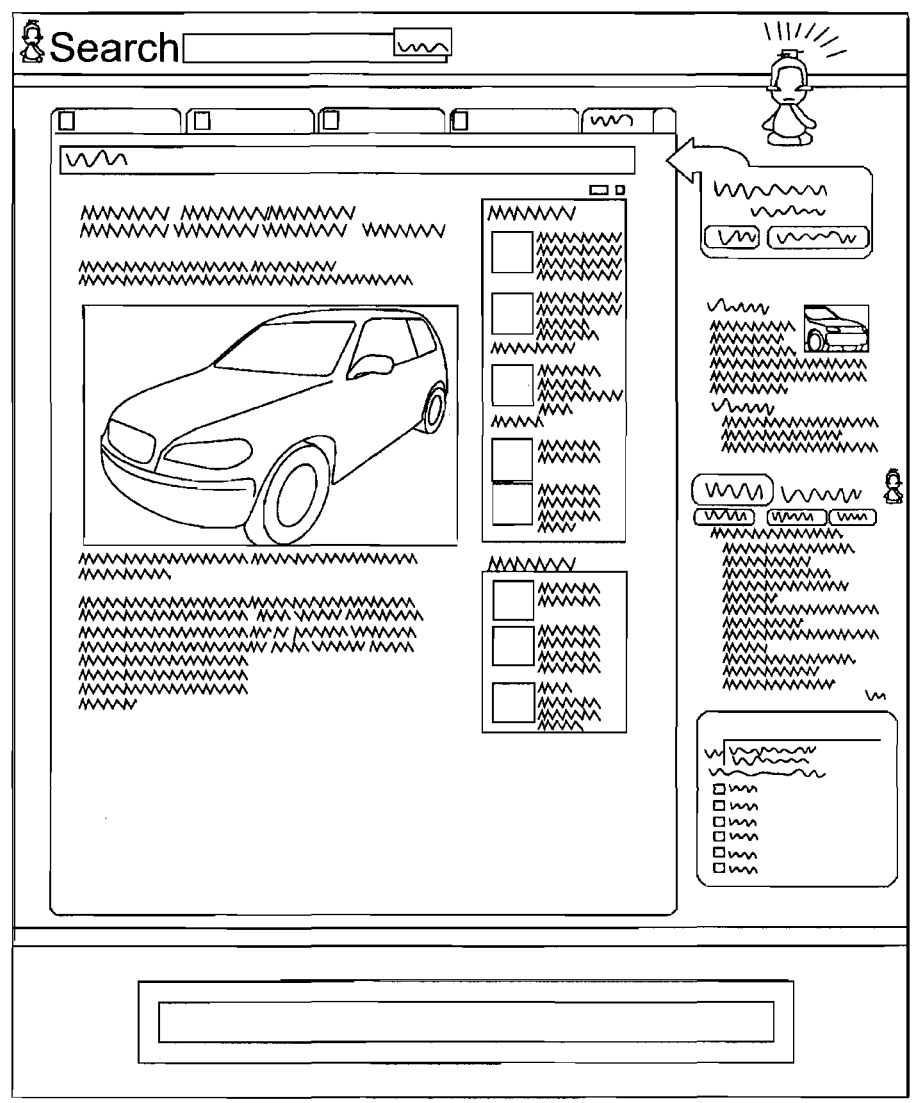
FIG. 26 illustrates an aspect of the present invention.
Figure 27:
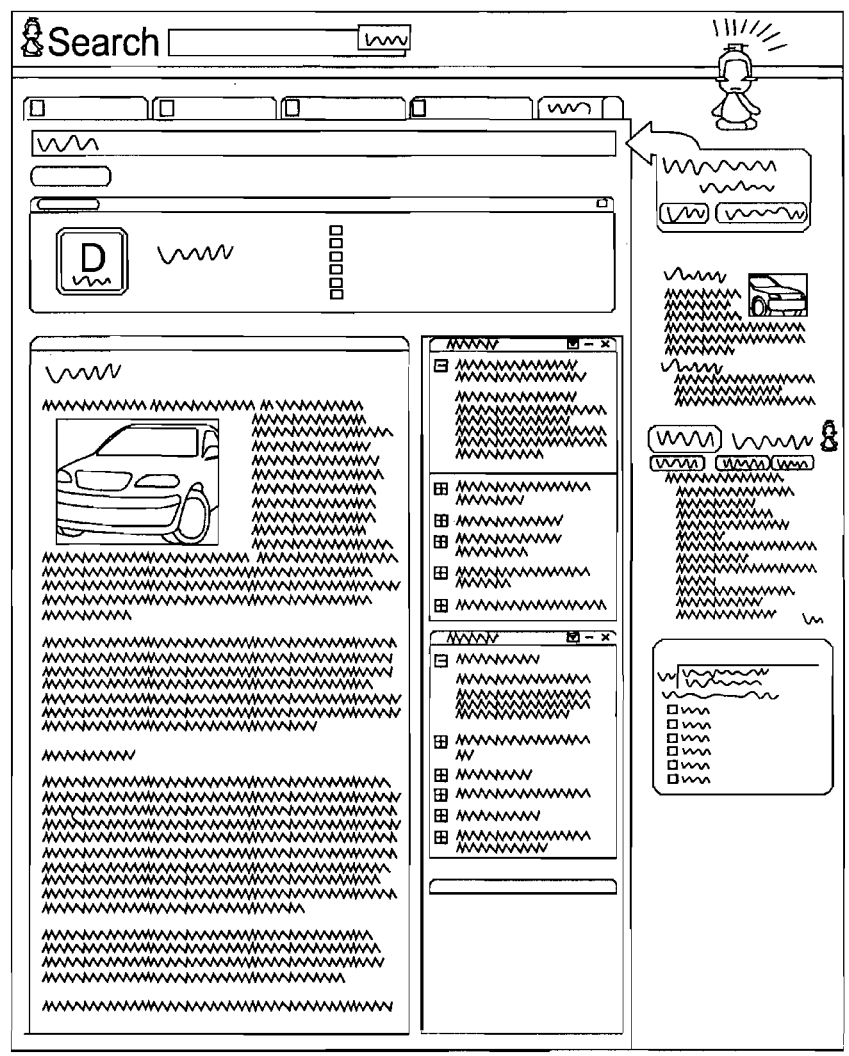
FIG. 27 illustrates an aspect of the present invention.
Figure 28:
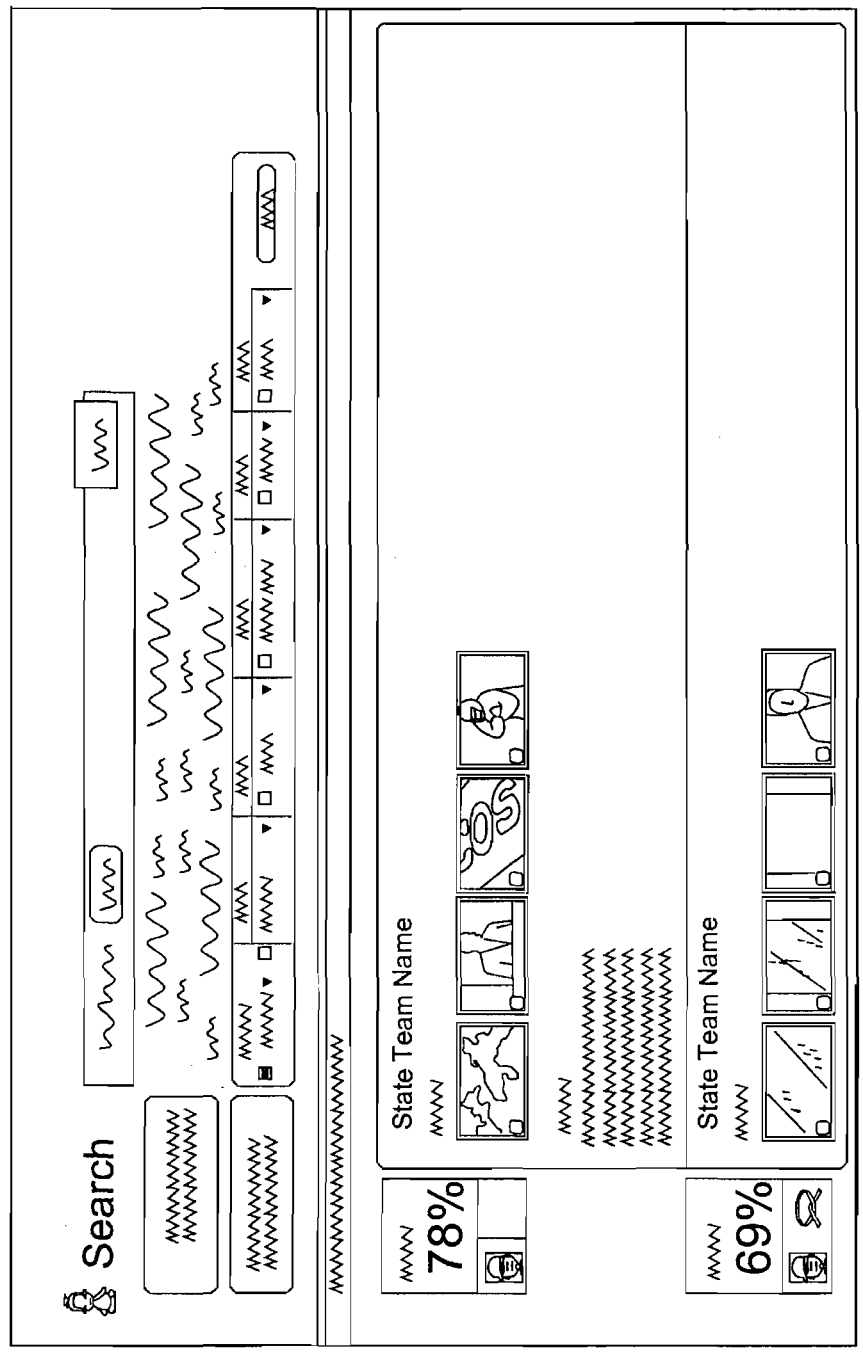
FIG. 28 illustrates an aspect of the present invention.
Figure 29:
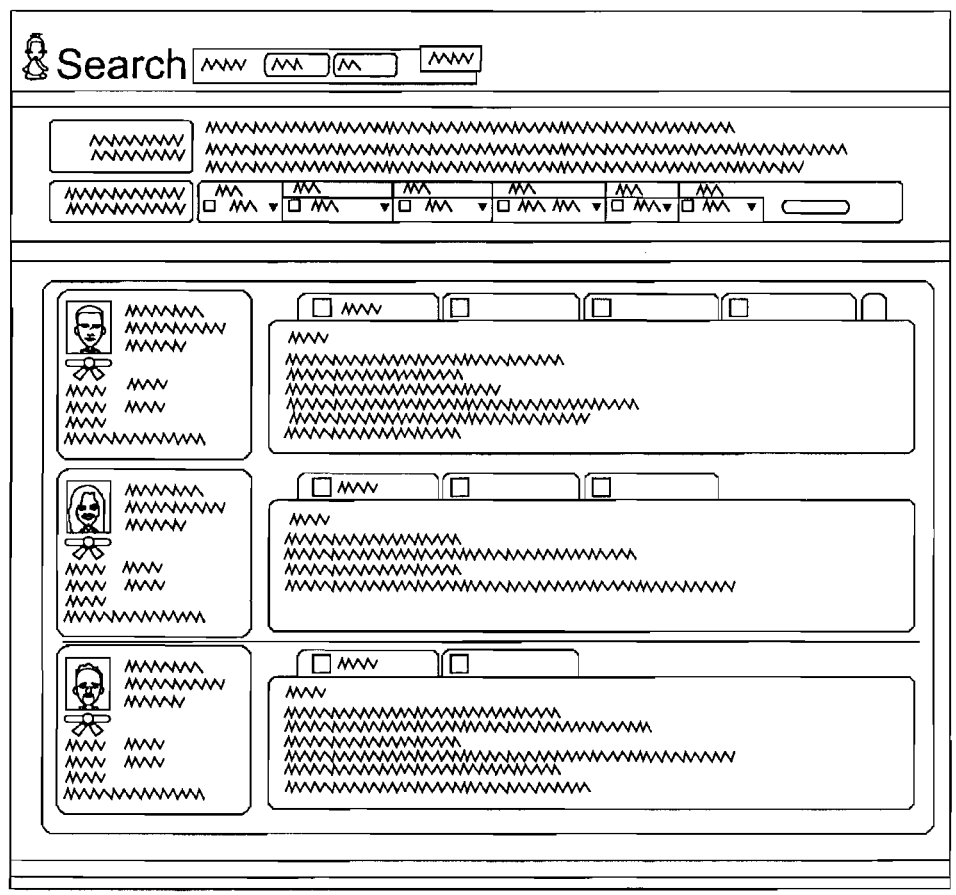
FIG. 29 illustrates an aspect of the present invention.
Figure 30:
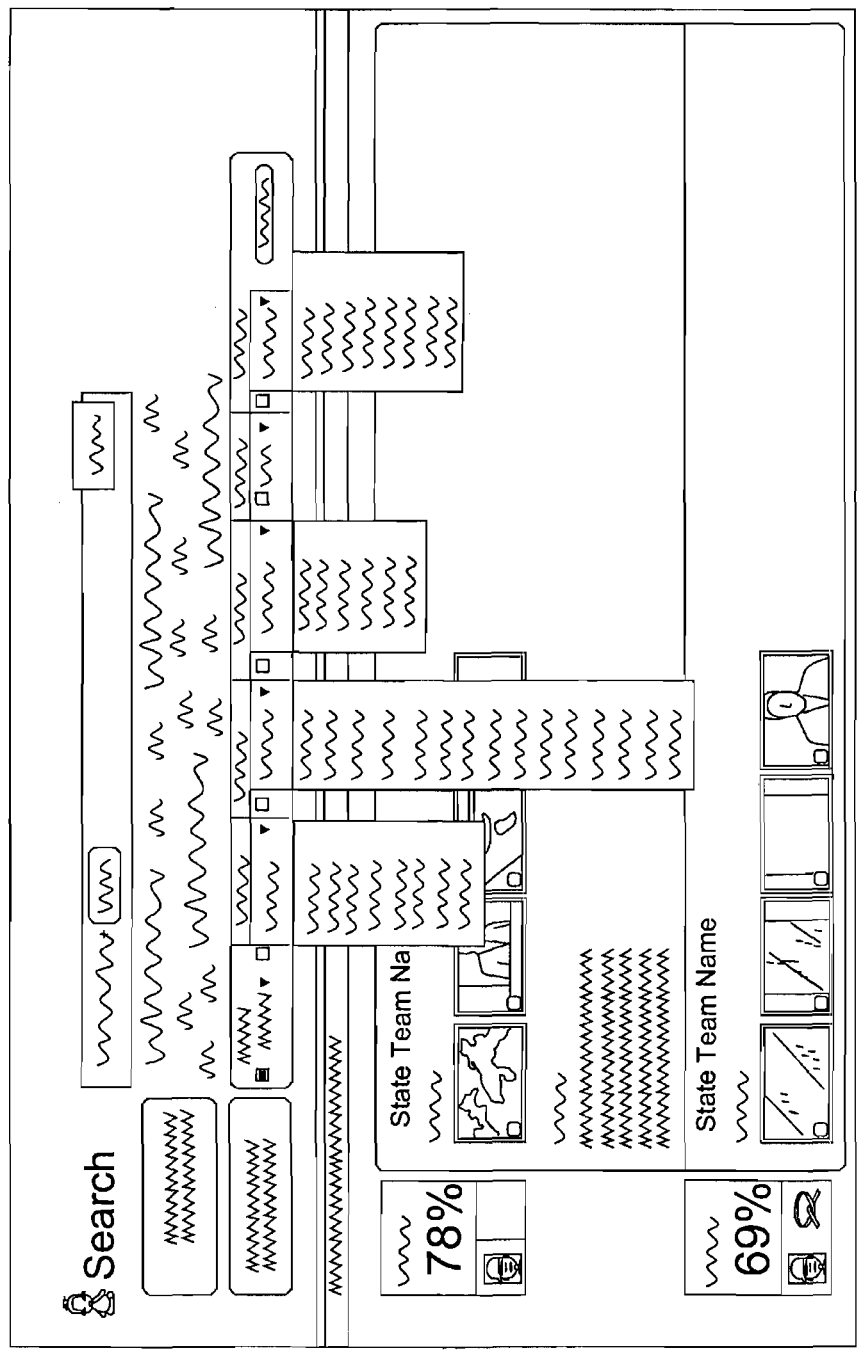
FIG. 30 illustrates an aspect of the present invention.
Figure 31:
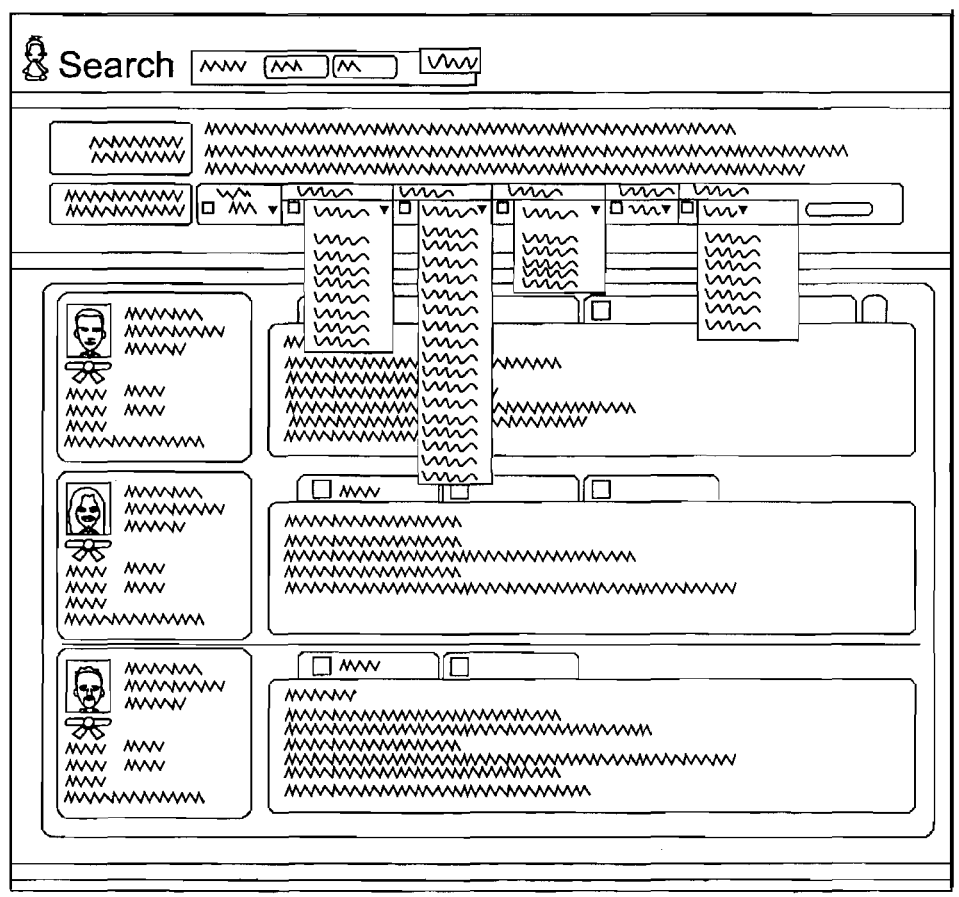
FIG. 31 illustrates an aspect of the present invention.
Figure 32:
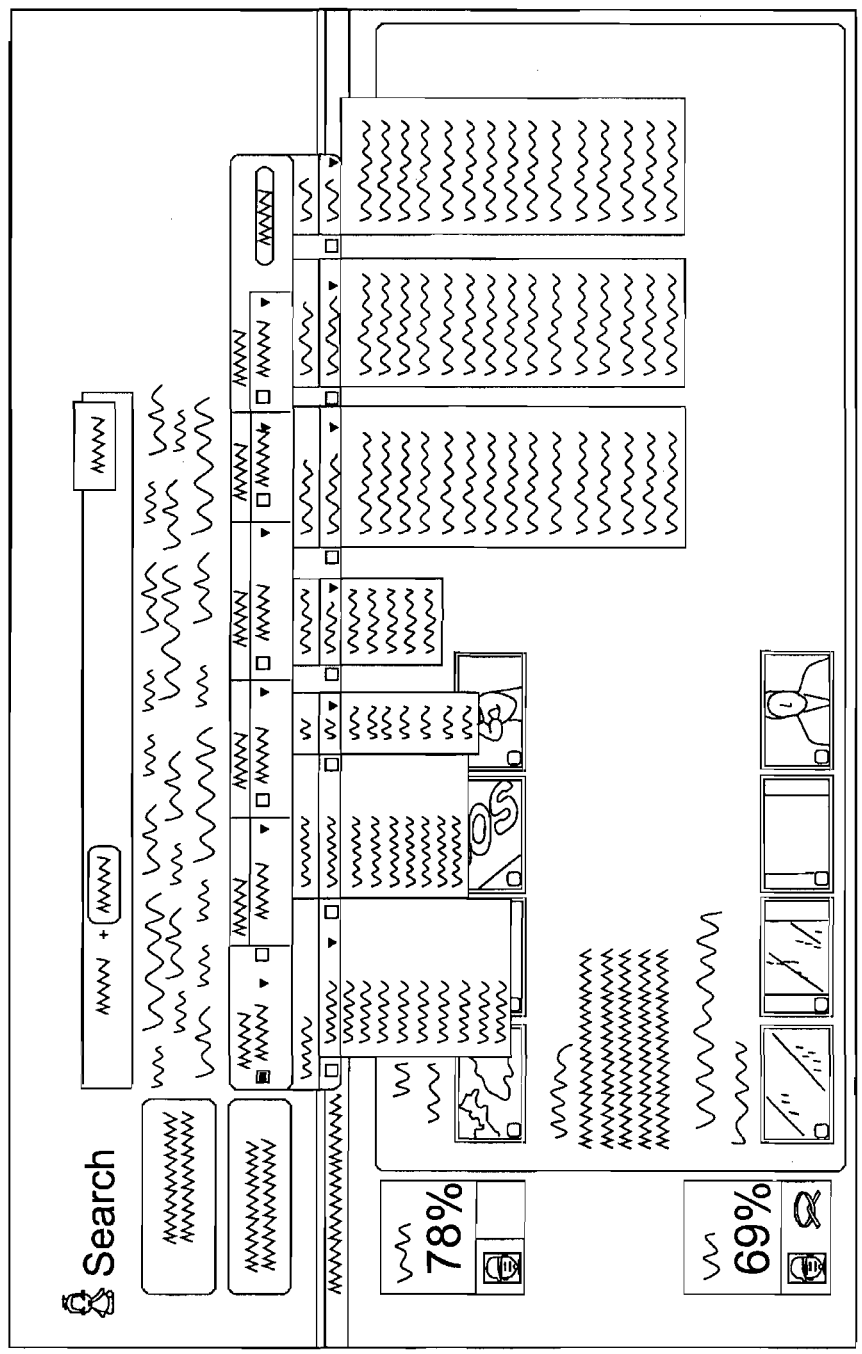
FIG. 32 illustrates an aspect of the present invention.
Figure 33:
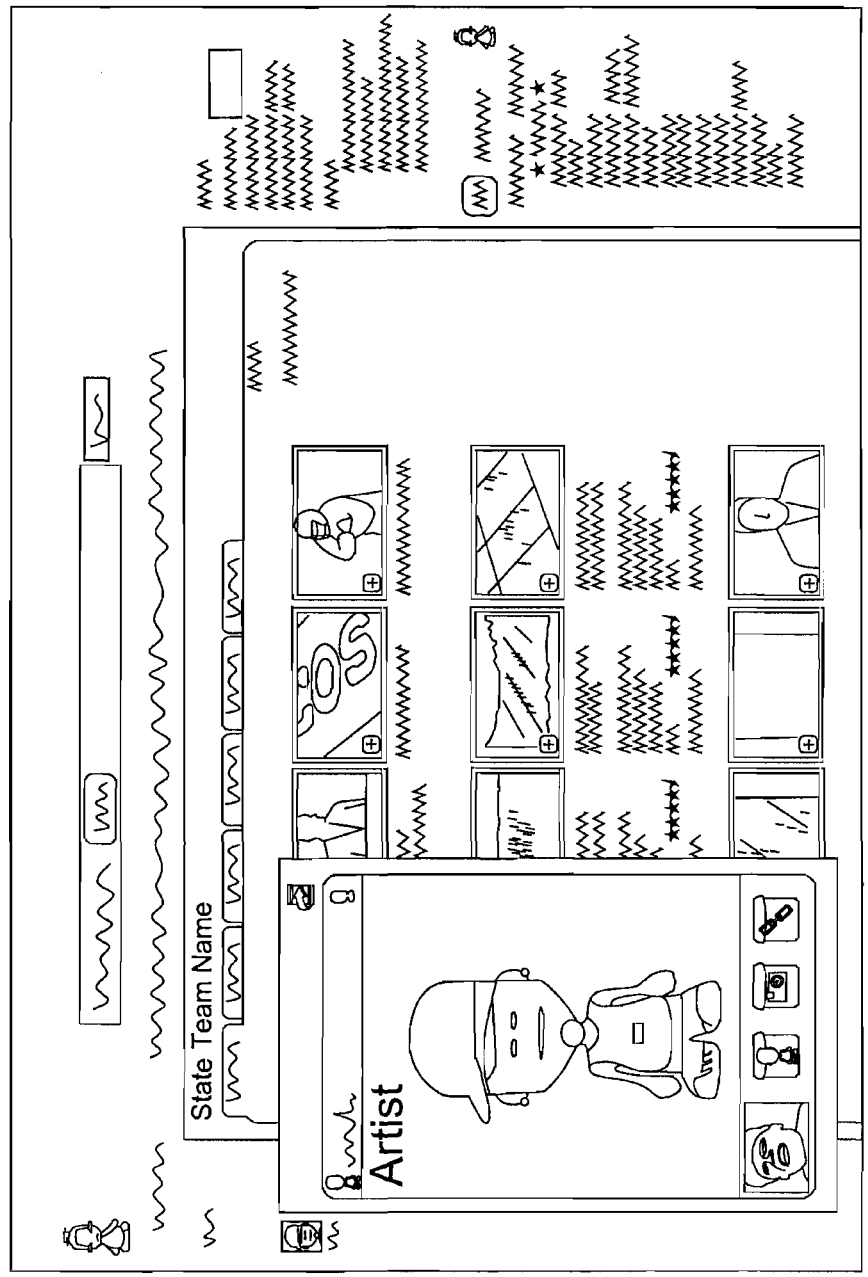
FIG. 33 illustrates an aspect of the present invention.
Figure 34:
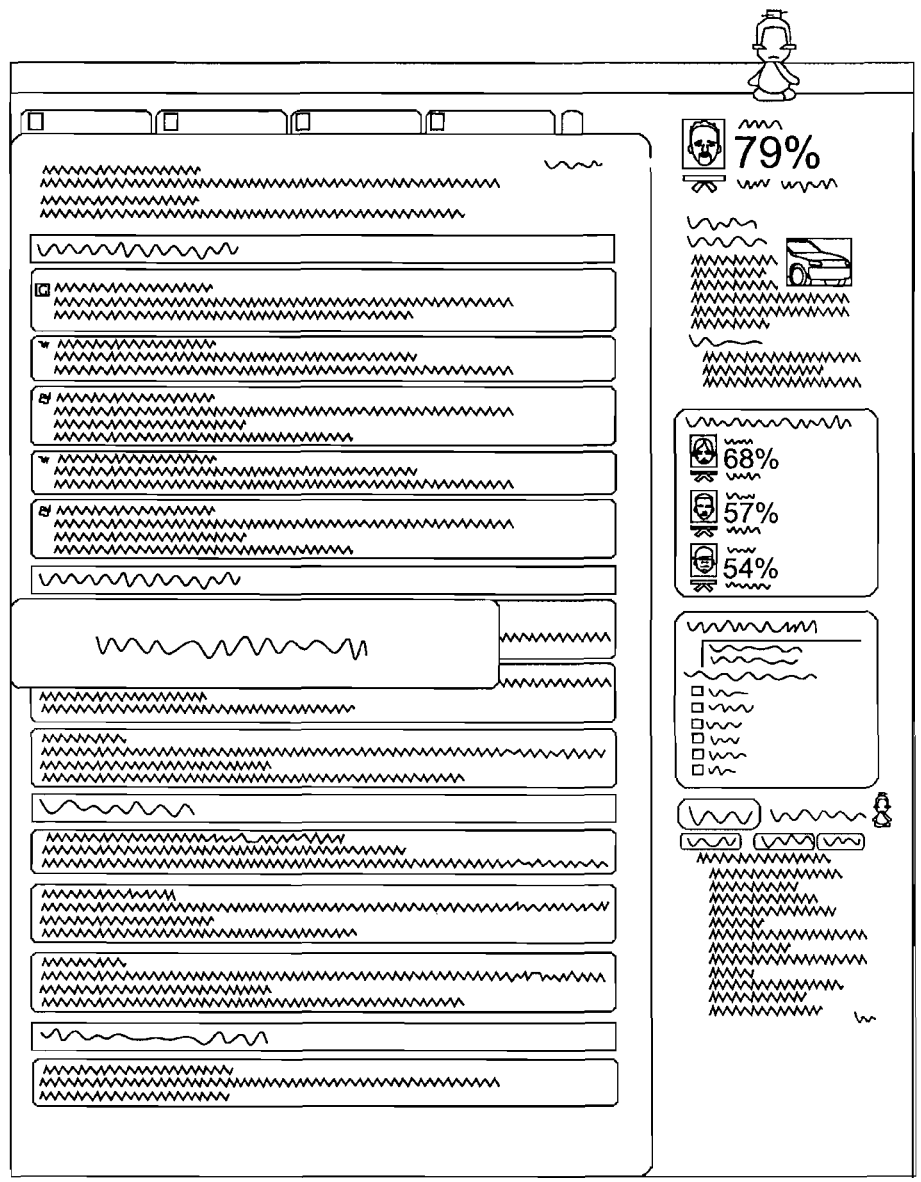
FIG. 34 illustrates an aspect of the present invention.
Figure 35:
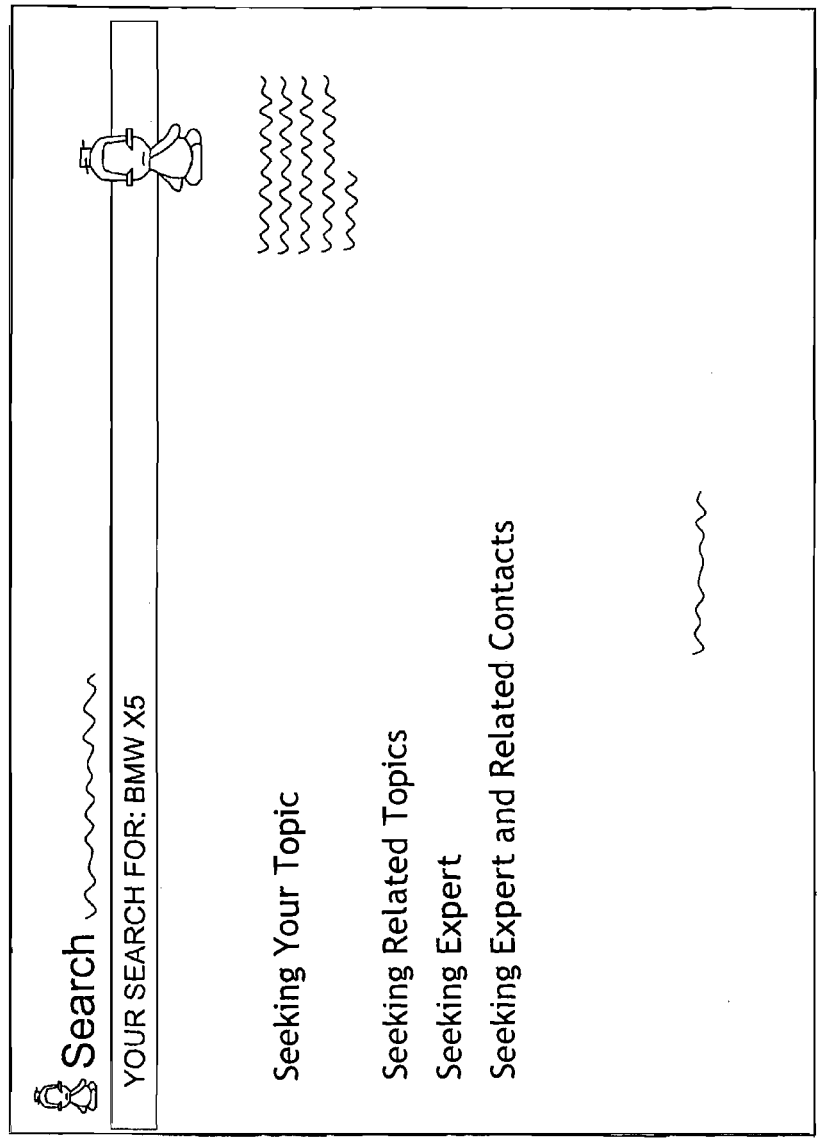
FIG. 35 is an exemplary executable search, according to an aspect of the present invention.
Figure 36:
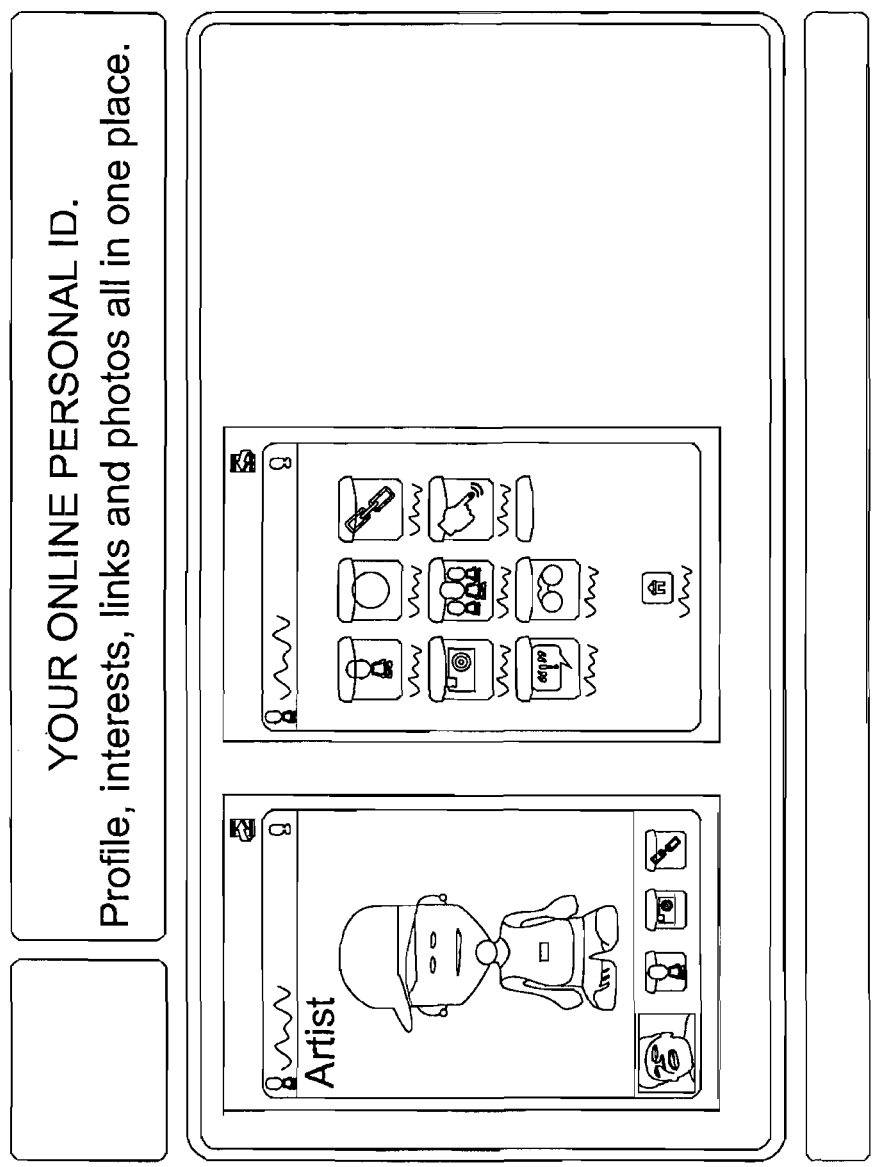
FIG. 36 is an exemplary avatar having customized attributes, according to an aspect of the present invention.
Figure 37:
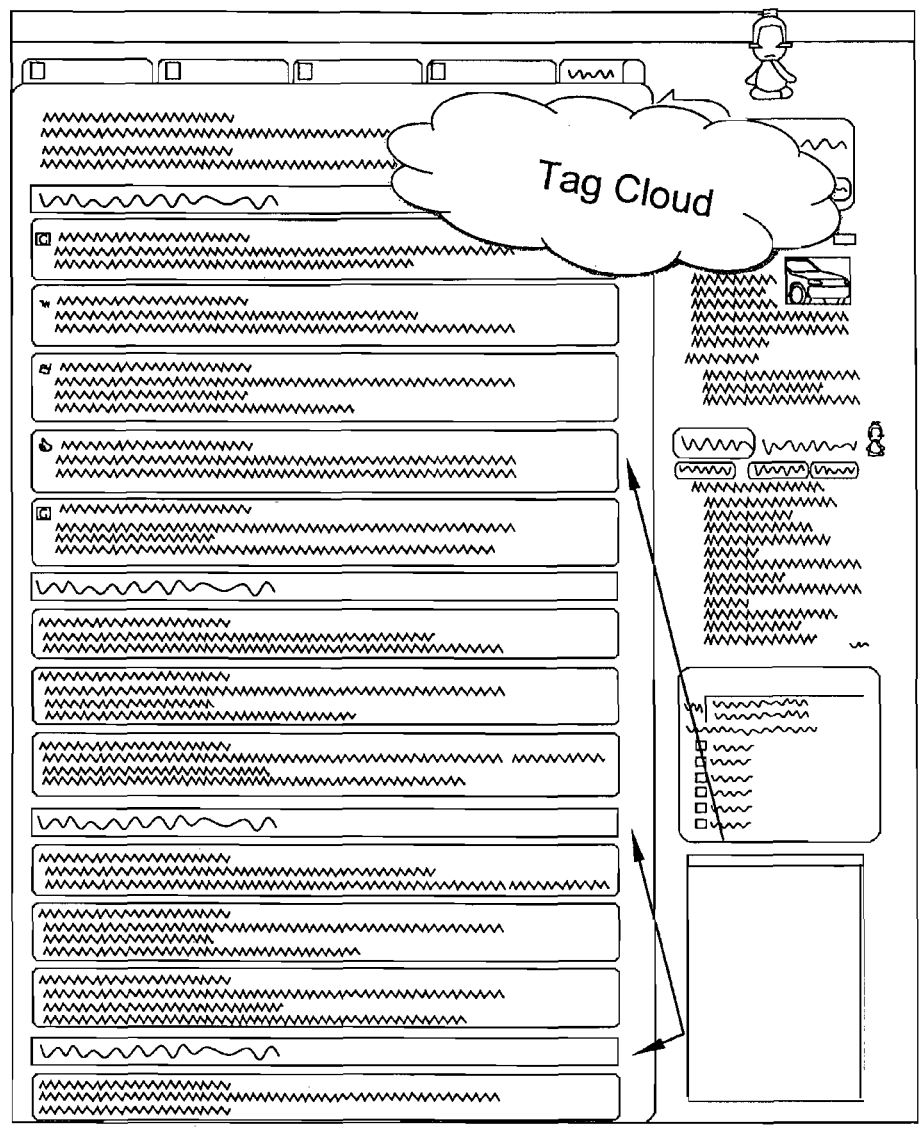
FIG. 37 is an exemplary search result, according to an aspect of the present invention.
Figure 38:
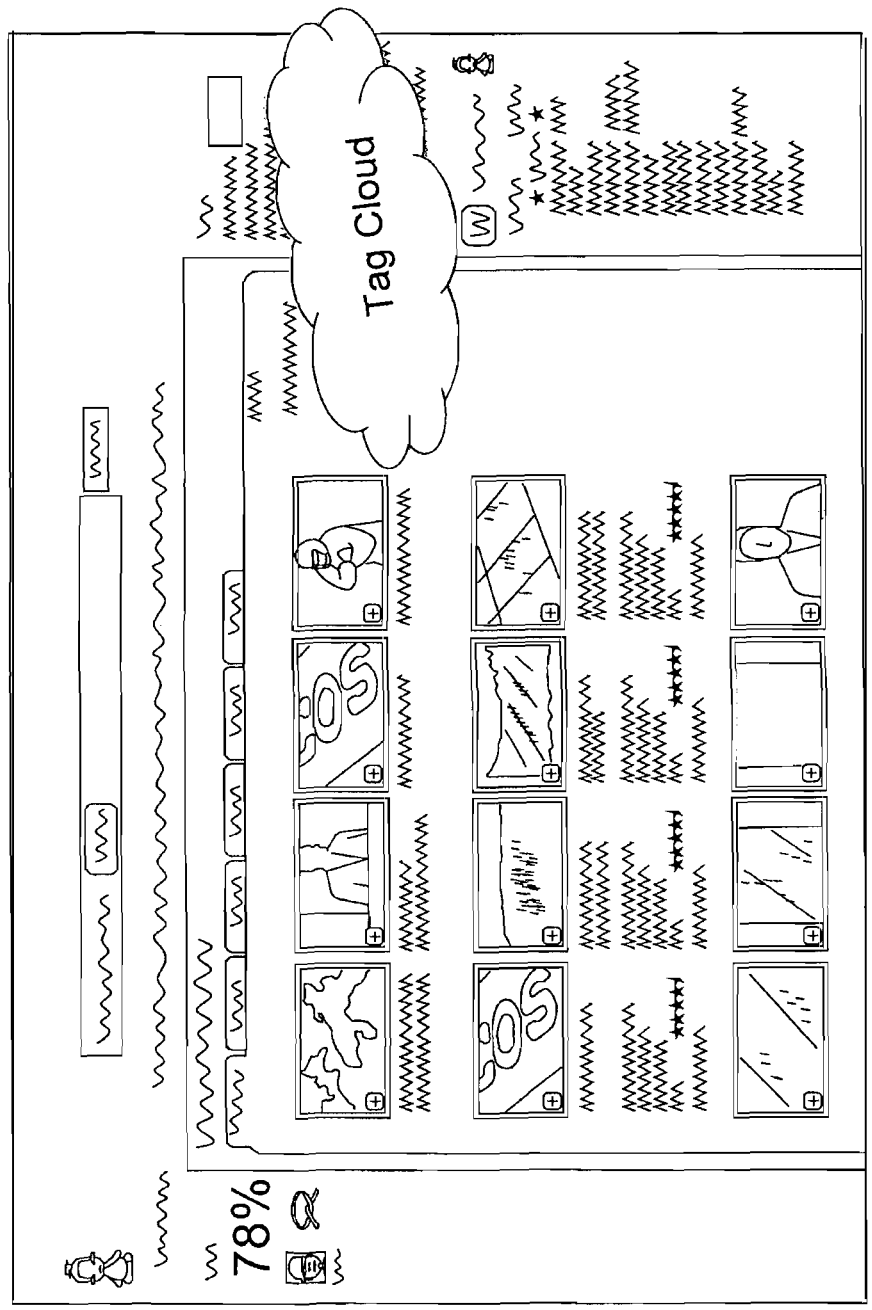
FIG. 38 is an exemplary presentation of a search result, according to an aspect of the present invention.
Figure 39:
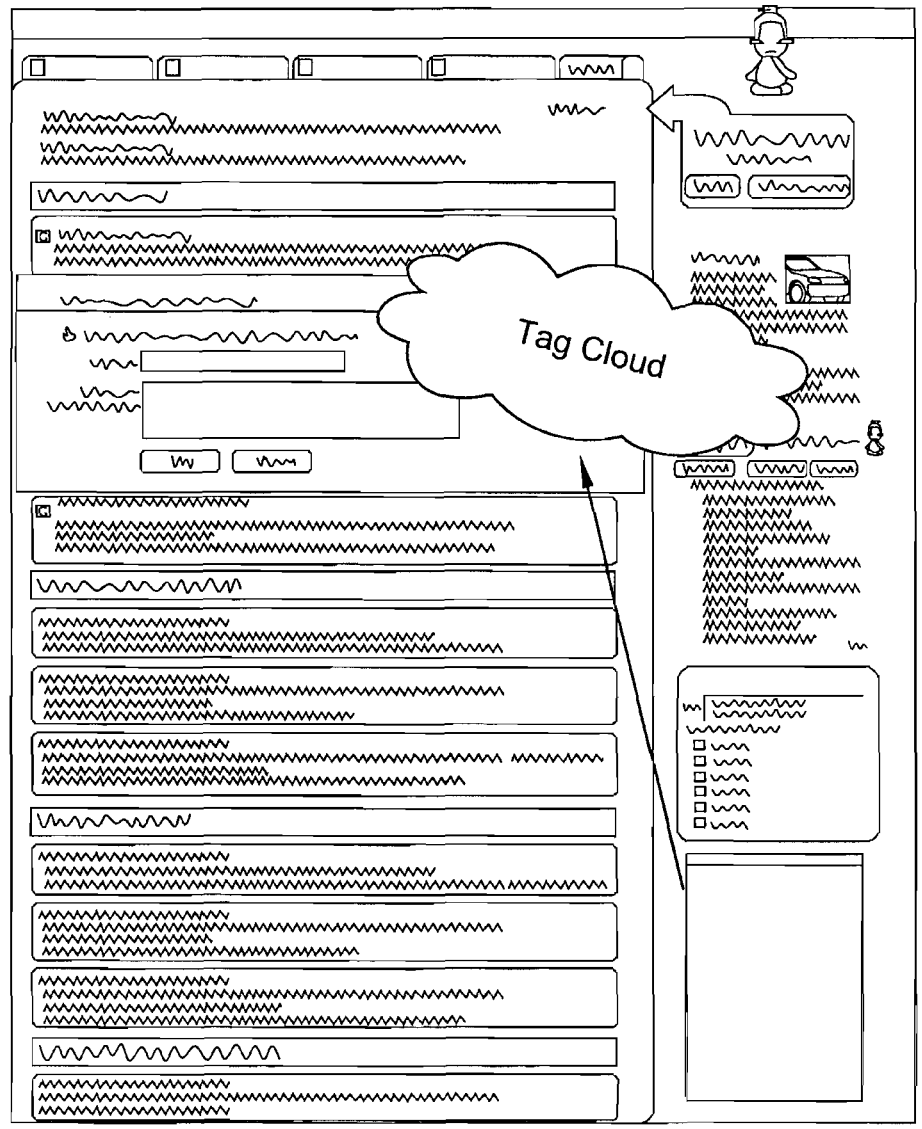
FIG. 39 an exemplary search result that provides addition to keyword-related favorites, tagging, and adding expert's quick note comments, according to an aspect of the present invention.
Figure 40:
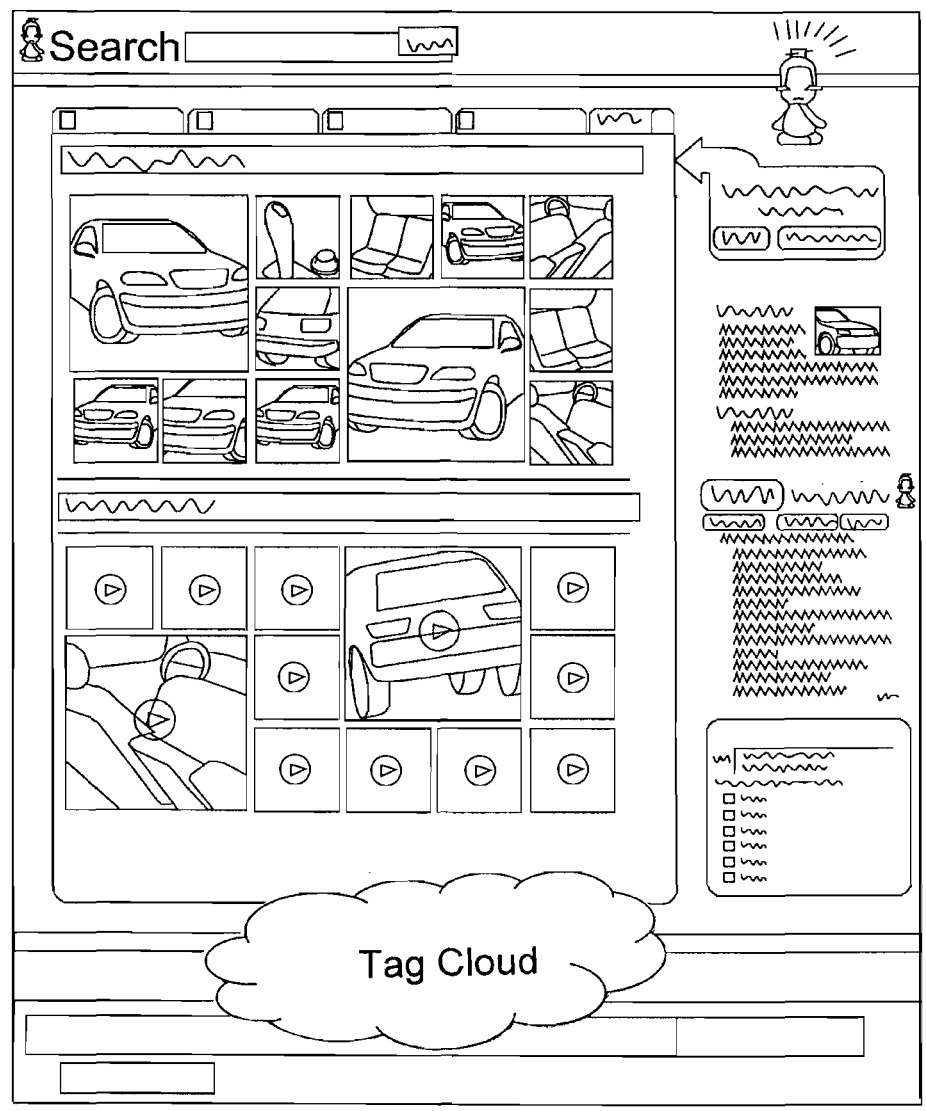
FIG. 40 is an exemplary search result including snapshots, thumbnails, and mouse-overs without actually entering the presented link, according to an aspect of the present invention.
Figure 41:
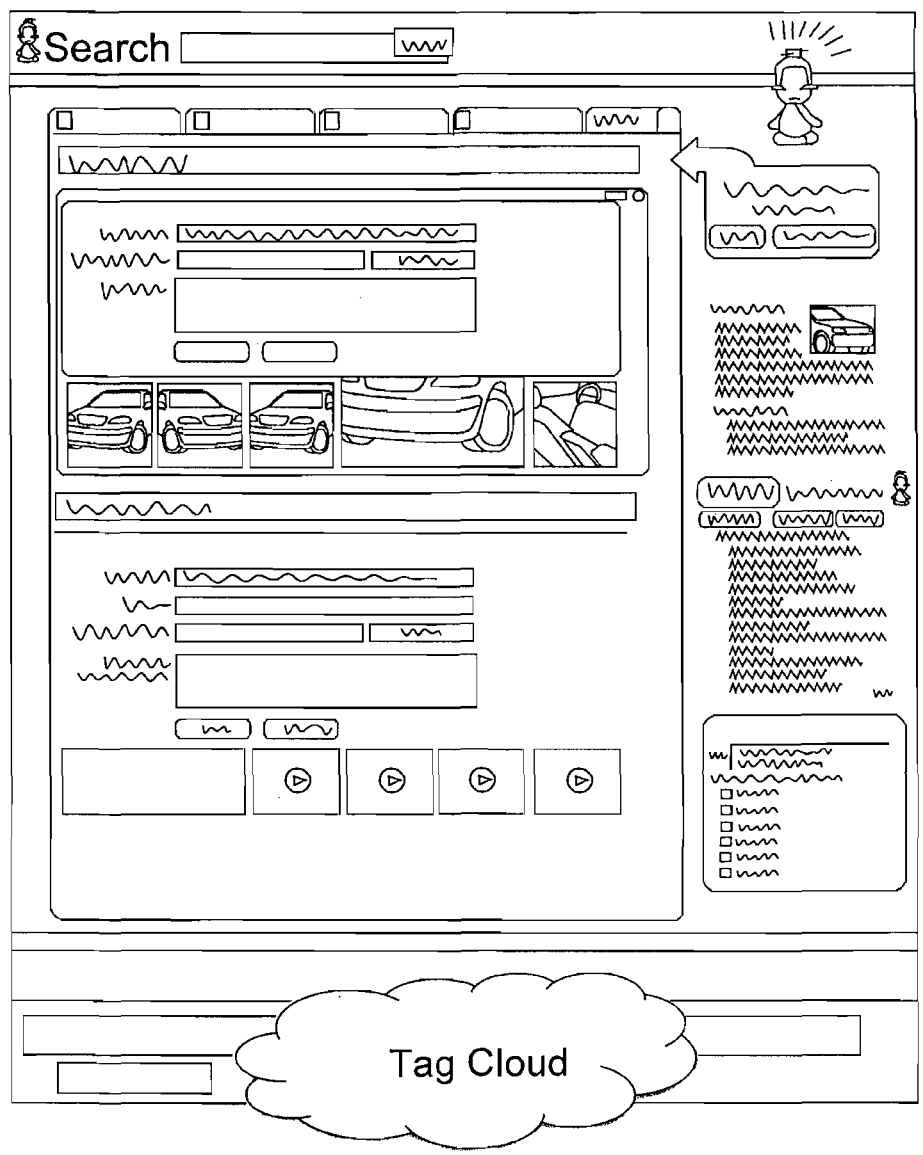
FIG. 41 is an exemplary search result as in FIG. 5, that a user may edit, upload, tag, or change, according to an aspect of the present invention.
Figure 42:
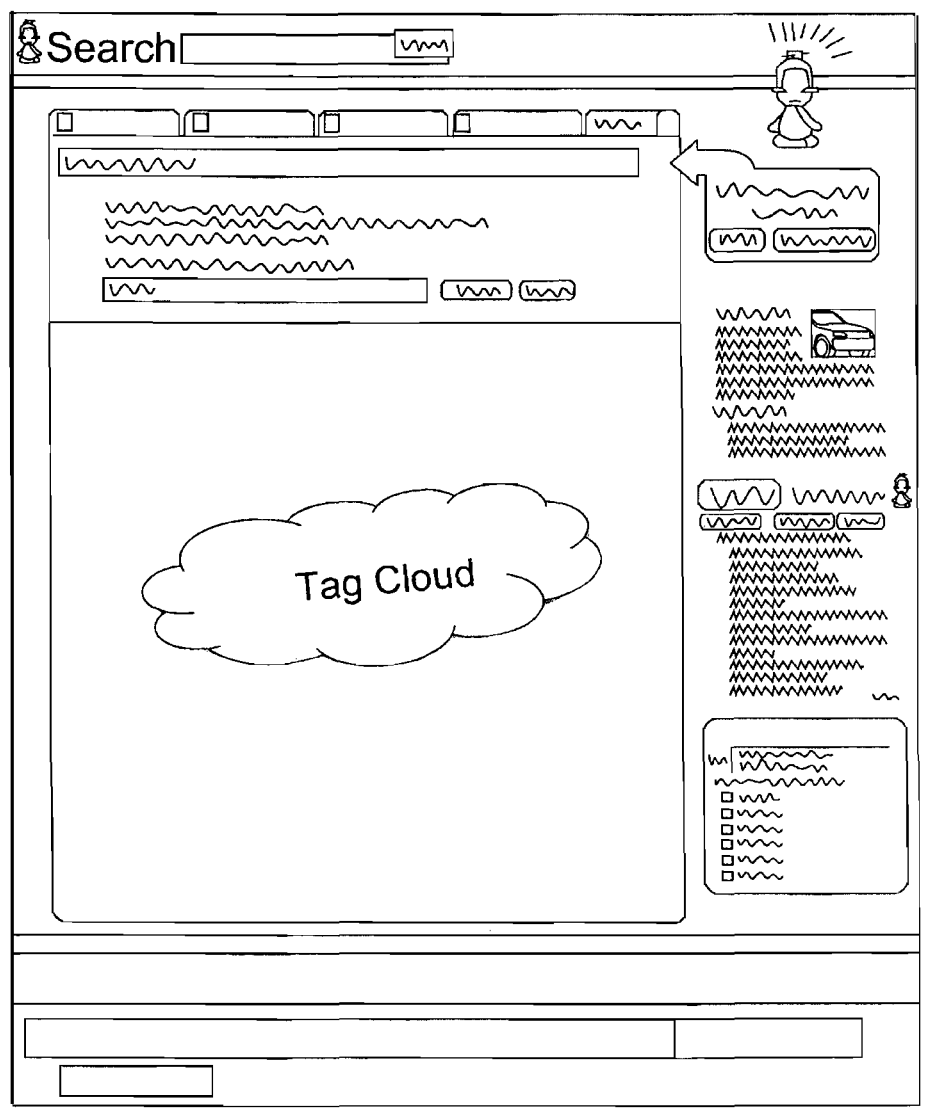
FIG. 42 is an exemplary format allowing a searching user to post a blog by entering a URL, according to an aspect of the present invention.
Figure 43:
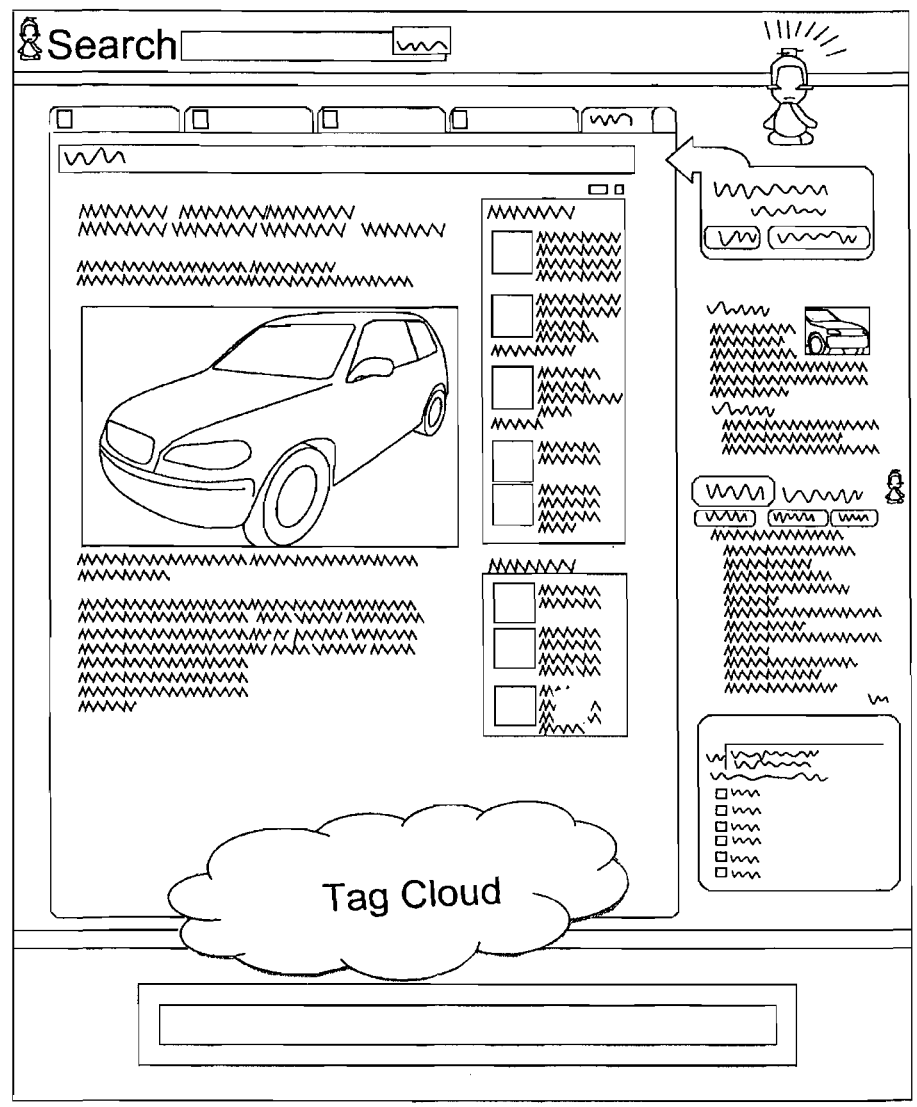
FIG. 43 is an exemplary format as in FIG. 42, where the blog may be posted to the user's search results tab, according to an aspect of the present invention.
Figure 44:
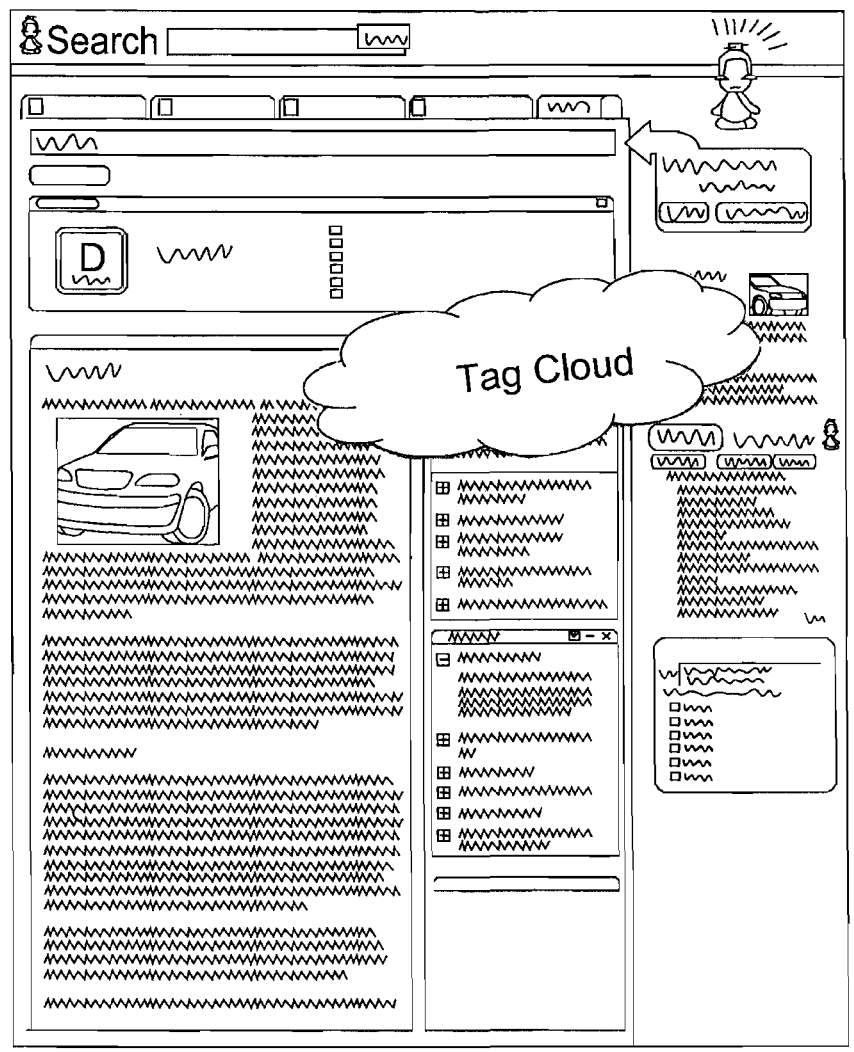
FIG. 44 is an exemplary created and published widget based on the formats of FIGS. 7 and 8, according to an aspect of the present invention.
Figure 45:
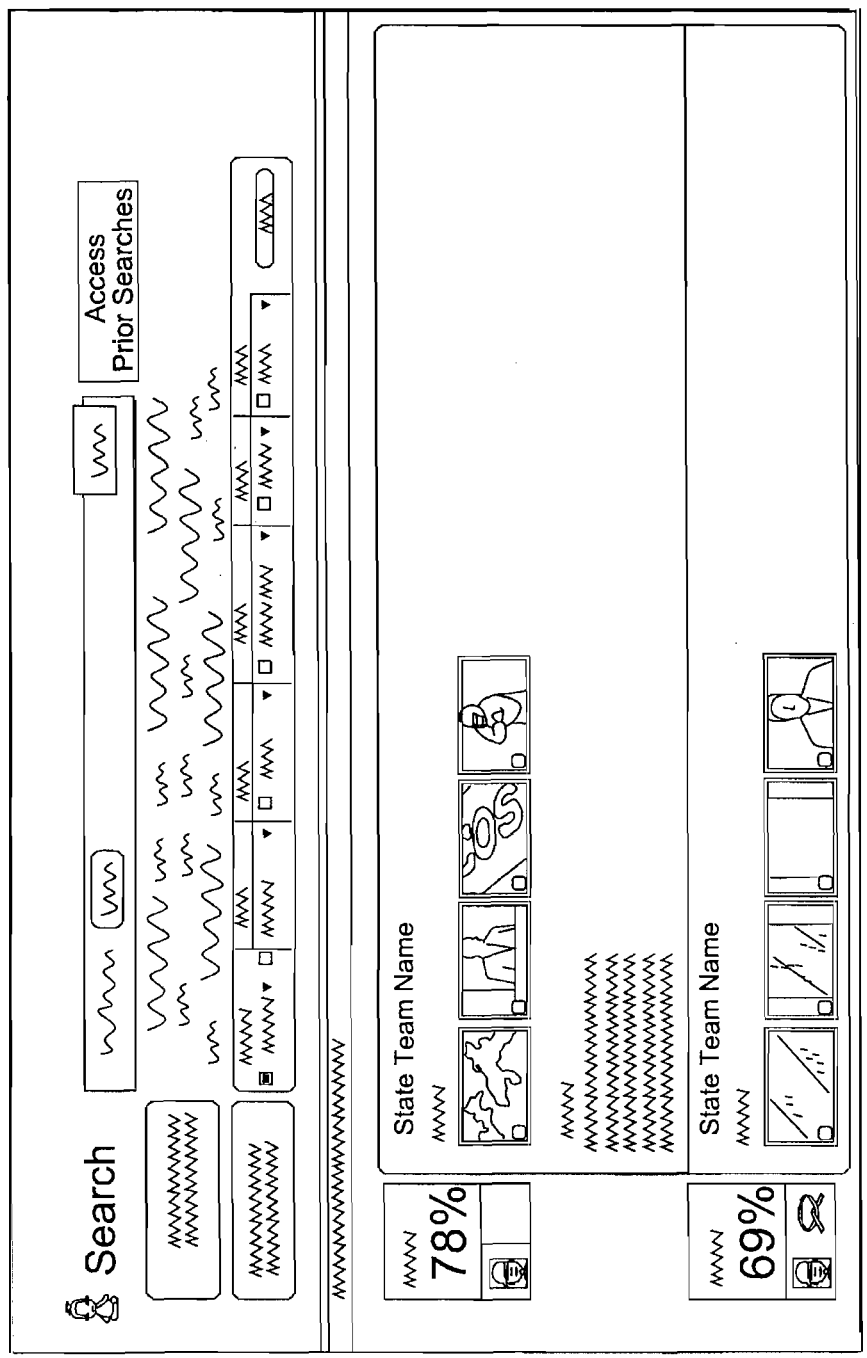
FIG. 45 is an exemplary search results page, based on assumptions, according to an aspect of the present invention.
Figure 46:
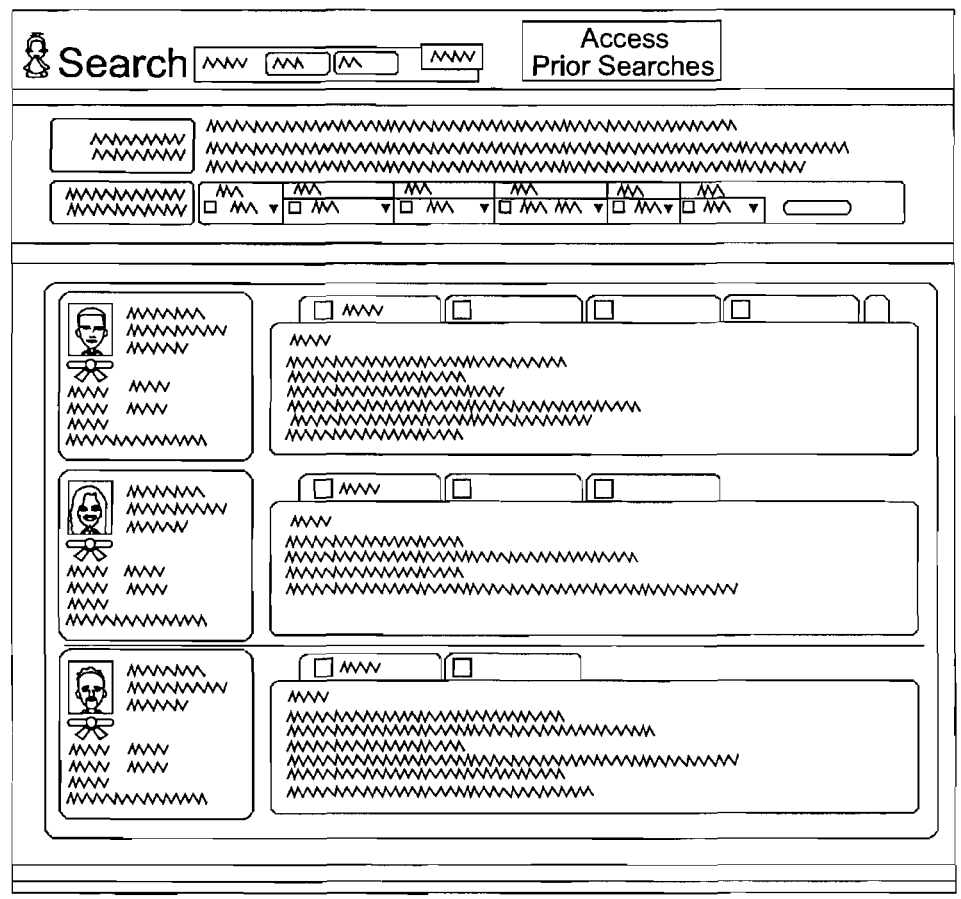
FIG. 46 is an exemplary search results page, where each keyword, and each additional keyword, can modify the expert matches for the search, according to an aspect of the present invention.
Figure 47:
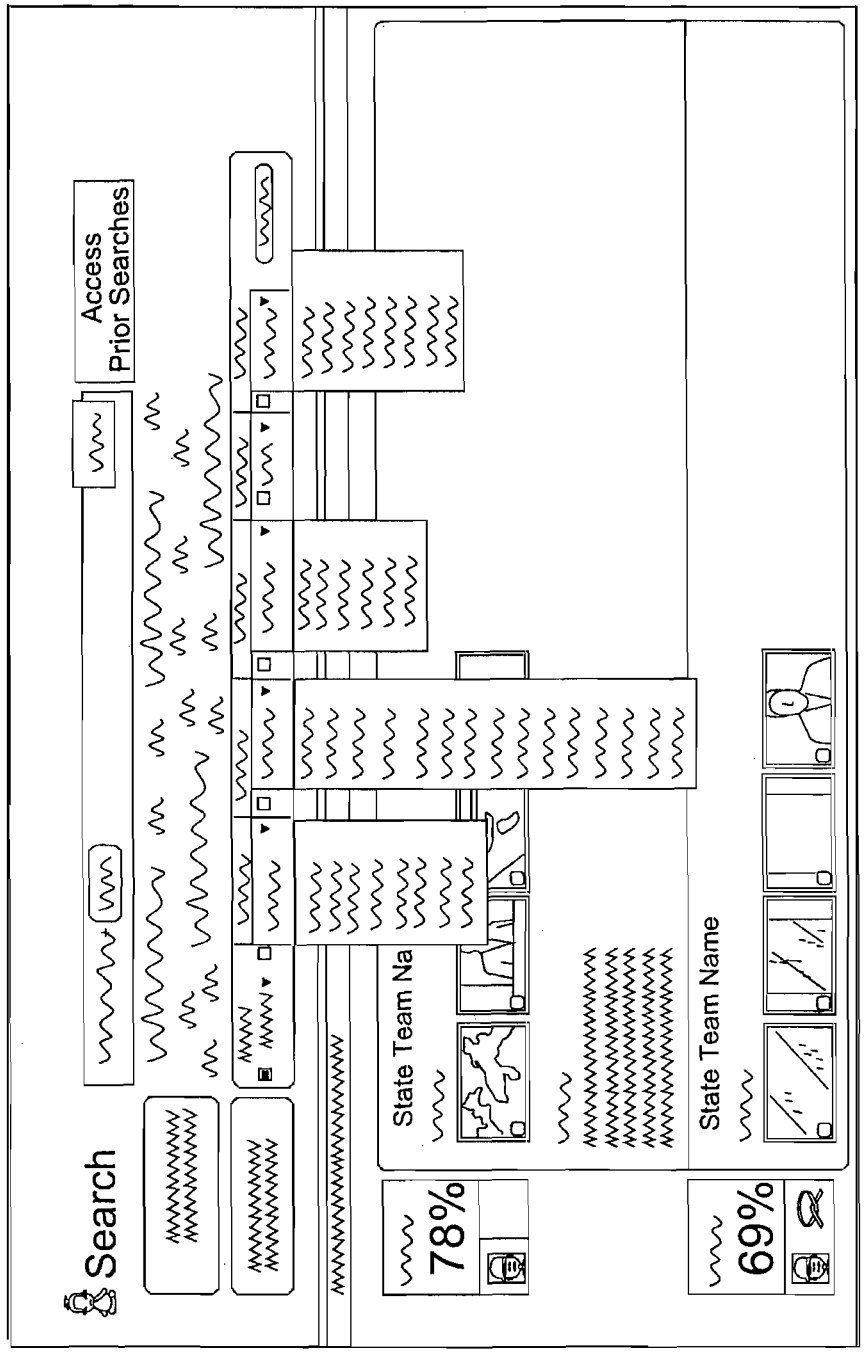
FIG. 47 is an exemplary search result providing filtering options, according to an aspect of the present invention.
Figure 48:
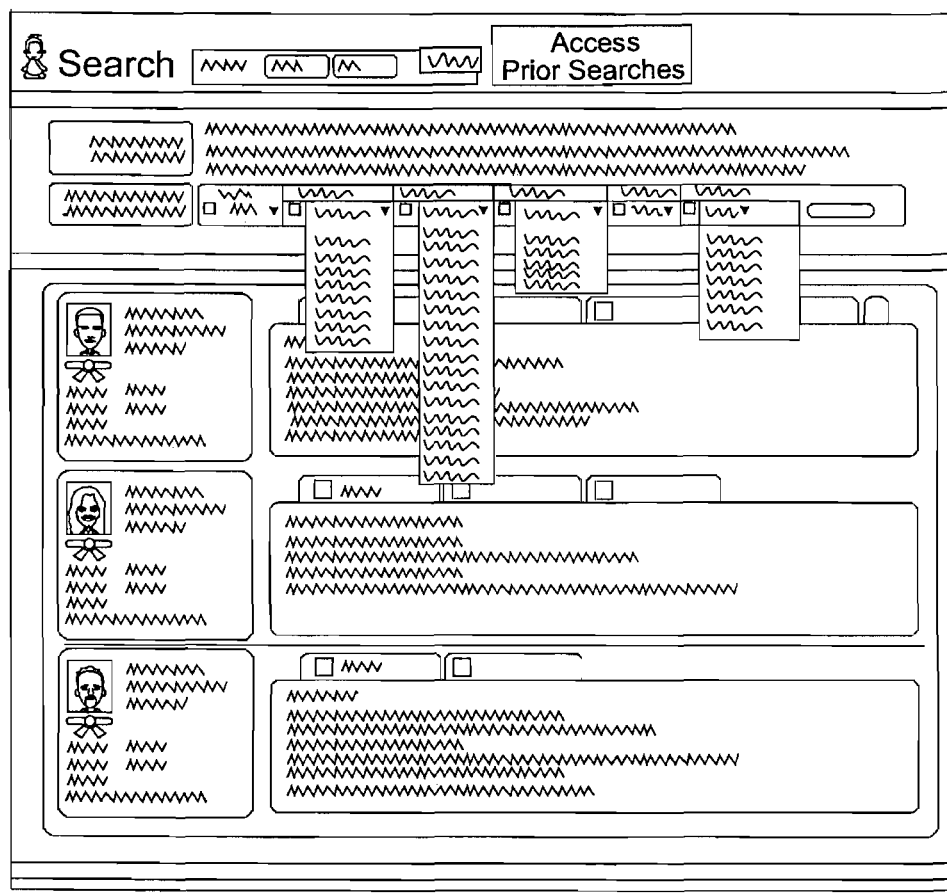
FIG. 48 is another exemplary search result providing filtering options, according to an aspect of the present invention.
Figure 49:
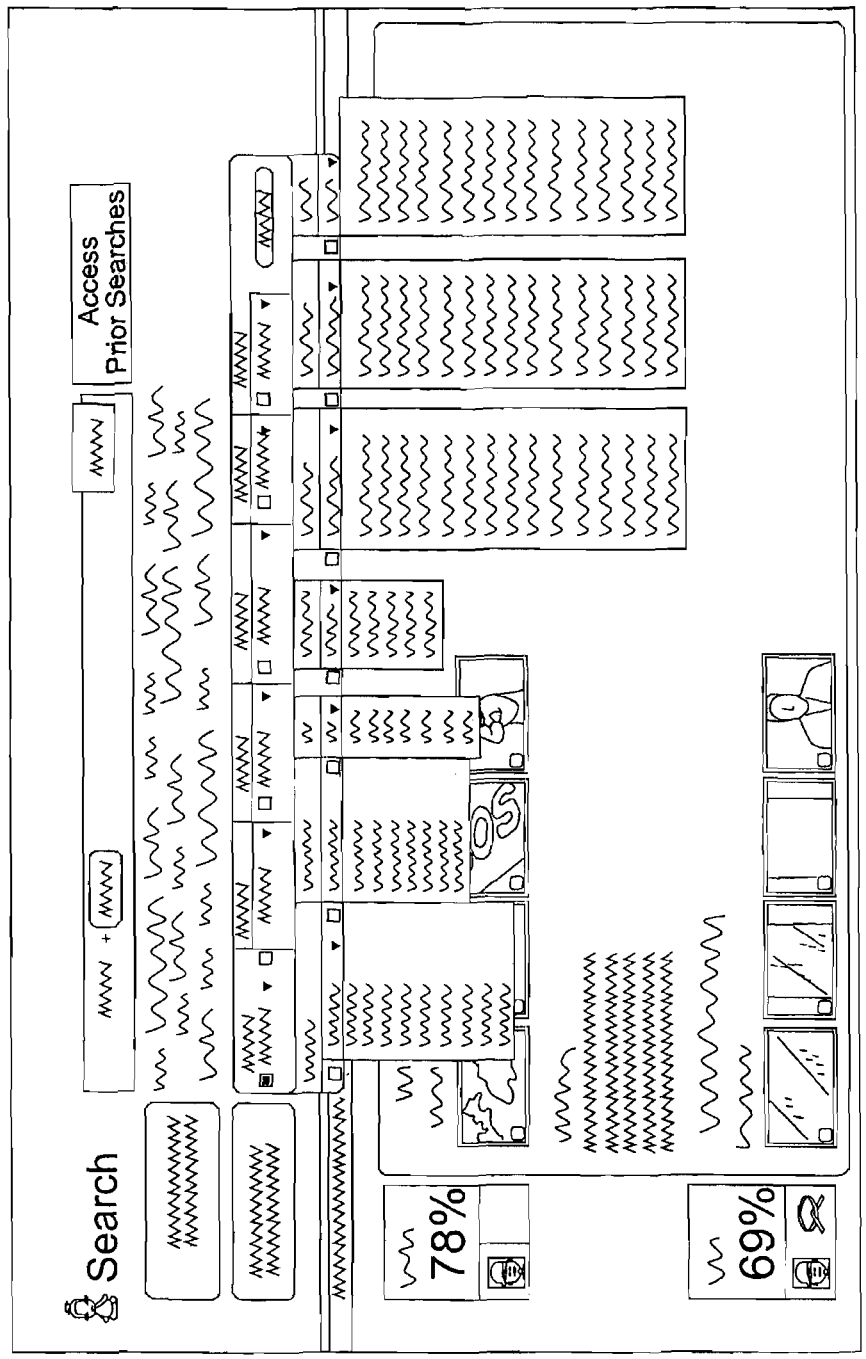
FIG. 49 is another exemplary search result providing filtering options, according to an aspect of the present invention.
Figure 50:
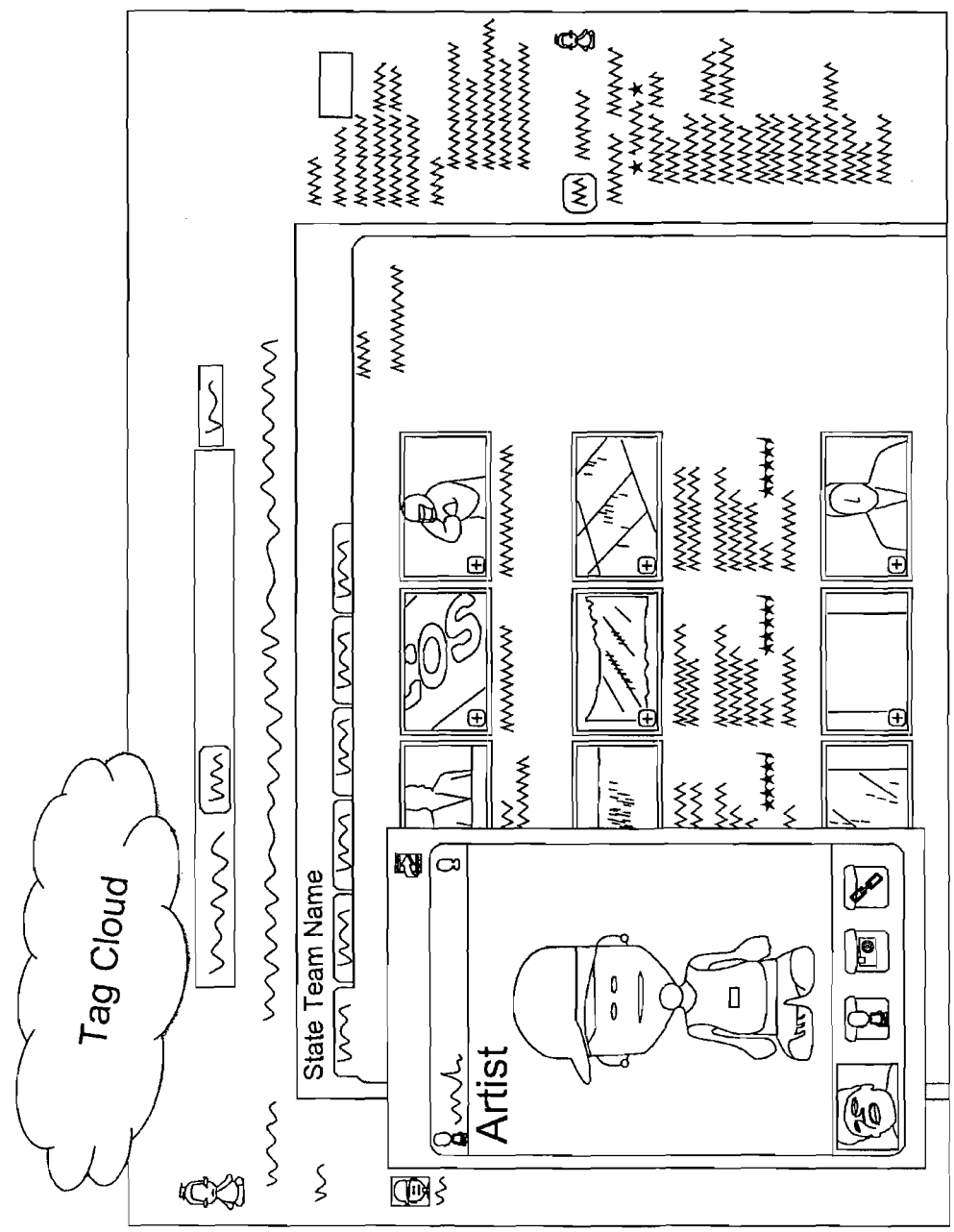
FIG. 50 is an exemplary selection, by a searching user, of one of the experts produced responsive to a search, according to an aspect of the present invention.
Figure 51:
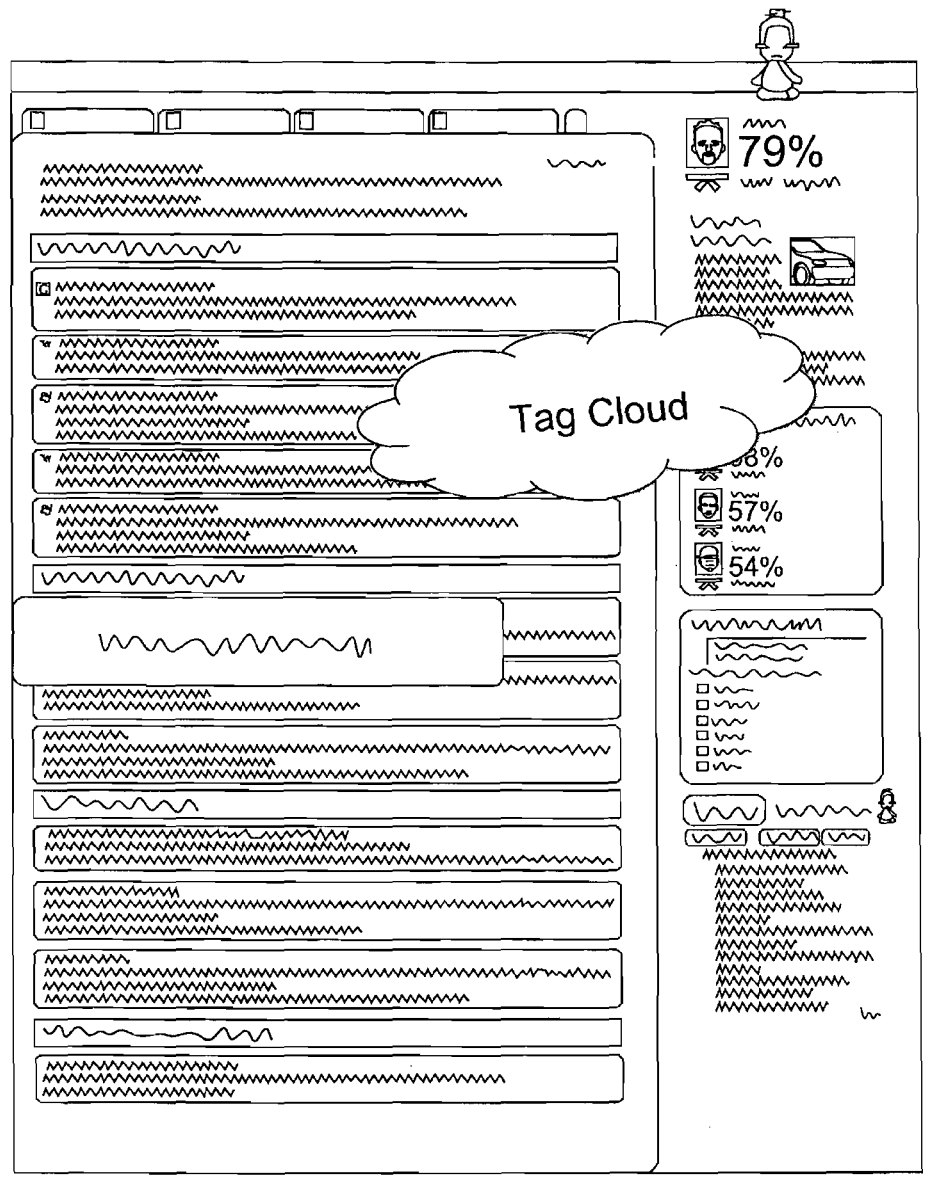
FIG. 51 is an exemplary page illustrating an expert's topical page related to search keywords entered by a user upon selection of that expert's page responsive to a first search, according to an aspect of the present invention.
Figure 52:
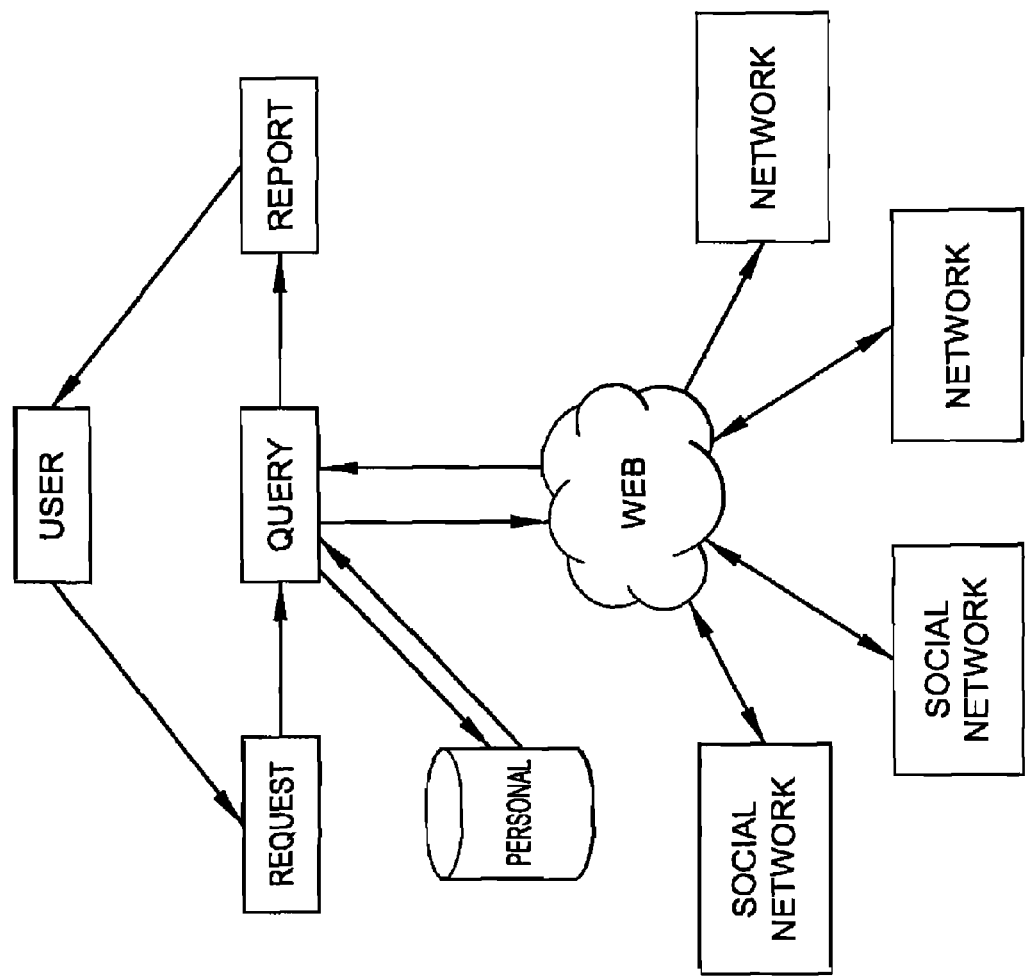
FIG. 52 is a block diagram of the crawl function of the present invention.

Referring now to FIG. 1, there is shown a block diagram illustrating an embodiment of a hypervisor presenting virtual machine ware, according to an aspect of the present invention. As may be seen in FIG. 1, there is shown diagrammatically the relationship between the BIOS, a hypervisor according to an aspect of the present invention, an operating system, and application software presented by one or more application spaces instantiated by the hypervisor.

As is generally understood in the pertinent art, BIOS stands for Basic Input/Output System. BIOS refers to the firmware code run by an IBM PC when first powered on. The primary function of the BIOS is to identify and initiate component hardware, such as hard disk, floppy and optical disk drives, by way of non-limiting example only. This identifying and initiating is to prepare the machine so that other software programs stored on various media may load, execute, and assume control of the PC. This process is known as booting, or booting up, which is short for bootstrapping.

Further, for example, BIOS may also be and/or include a coded program embedded on a chip that recognizes and controls various hardware, firmware or software devices that make up a PC. The BIOS typically runs from a PROM, EPROM or, most commonly, flash memory when the computer is powered on. It initializes several motherboard components and peripherals.

Finally, the BIOS preferably loads the boot loader for the operating system of a PC, and transfers control to it. The entire process is known as power-on self-test (POST). Once system memory is initialized, the BIOS typically copies/decompresses itself into system memory and continues executing from therein. Nearly all recent BIOS implementations may optionally execute a setup program interfacing the nonvolatile BIOS memory. This memory holds user-customizable configuration data (passwords, time, date, hard drive details, etc.) accessed by BIOS code. In most modern BIOS implementations, users select where the BIOS obtains its boot image: CD, hard disk, floppy disk, USB device or via a networked connection. This is particularly useful for installing operating systems or booting to a LiveCD or flash keydrive, for example, and for selecting the order of testing for the presence of bootable media. Some BIOS allow the user to select the operating system ("OS") to load (e.g. loading a secondary OS from a second hard disk), though this is more often handled by a second-stage boot loader.

Referring now to the operating system of FIG. 1, the operating system (OS) is generally the software that manages the resources of a computer and provides programmers with an interface to access those resources. An operating system processes system data and user input, and responds by allocating and managing tasks, applications and internal system resources as a service to users and programs of the system. An operating system performs basic tasks such as controlling and allocating memory, prioritizing system requests, controlling input and output devices, facilitating computer networking and managing applications and files. Operating systems as used herein may be found on almost anything made with integrated circuits, such as personal computers, internet servers, cell phones, music players, routers, switches, wireless access points, network storage, game consoles, digital cameras, sewing machines and telescopes.

Referring now to the application space of FIG. 1, application software is a subclass of computer software that employs the capabilities of a computer directly and thoroughly to a task that the user wishes to perform. This should be contrasted with system software which is involved in integrating a computer's various capabilities, but typically does not directly apply them in the performance of tasks that benefit the user. In this context, the term application refers to both the application software and its implementation.

Referring now to the hypervisor, the hypervisor is, as discussed hereinabove, a virtualization platform that allows multiple operating systems to run on a host computer at the same time, and/or that coordinates multiple actions, such as between and among the BIOS, application space within hyperspace, and a core. A hypervisor may, for example, enable a second operating system to simultaneously perform process management, memory management, disk and file systems, networking, security, and device drivers as discussed herein throughout.

Hyperspace is an operating environment, that is, a layer on top of the BIOS, that may run side-by-side with Windows or another operating system to more efficiently implement some of the most commonly used apps on a PC by instantiating a hypervisor to implement control of certain hardware, such as through a core to the BIOS, and certain software, such as that resident in an application space within the hyper space. There may be several benefits to running and operating in the hyperspace created by a hypervisor. First, moving some of the applications that inadvertently slow down the first operating system, such as Windows for example, such as antivirus and malware-scanning utilities, out of the first operating system altogether and into an application space for such applications within the hyperspace may create efficiency in the first operating system. Such efficiencies may be created by reducing the overhead in the first operating system. Further, the hyperspace may be able reduce the power usage in view of certain uses of the application space, such as through an interaction down through the BIOS to hardware, which may have increased importance particularly in a laptop environment.

A web property that may create a neutral platform for consolidation, aggregation and integration of a user's favorite websites and web based applications may run as an application within the application space. This property may be a webtop which functions and behaves much like a traditional PC desktop. However, this webtop may run entirely inside a traditional web browser, and its functionality may, via hyperspace, not be limited to a single device or platform. For example, creating a drag and drop functionality for accessing content, this webtop may provide a centralized storage and access point for all content and web applications a user desires. A user may be thus able to access favorite web properties, including multiple sites, IM services, VOIP services, email accounts, and social networking sites to name a few, from hyperspace. The webtop may thus offer users drag-and-drop content functionality, web-based centralized storage, and collaboration tools.

The webtop may utilize a core structure based on life-segment and present dynamic data triggered by key life events. By dividing the webtop into segments (work, family, entertainment, and community), marketing, advertising and strategic channels and partnerships may be better developed.

The hyperspace webtop may, for example, incorporate a video channel with niche content to be supplied. The hyperspace webtop may be able to capitalize more aggressively on advertising revenue when this content is viewed either on the webtop or video channel, such as due to the fact that the instantiation into hyperspace of this webtop "hard codes" this webtop into the BIOS, thus meaning this process and the desired manner of presentations, such as advertisements, cannot be changed by the user. The webtop may also provide opportunities to generate revenue by selling "Tabs" on the webtop to content providers who want to create their own sub-experience within the webtop. Such tabs and the overall webtop may be driven by life segments, including work, family, friends, and entertainment. The user's content may be organized according to these categories and may be customized or expanded by the user. Content may be populated through the user's personal profile as well as through a "directory" system that facilitates the discovery and addition of content or applications.

The webtop may be integrated into the operating system, such as via a presence in the application space of a hypervisor, to mandate presentation to the user upon turning on the computer. This means the user will be presented with the webtop every time the computer is turned on and it becomes a "cover page" which is ultimately the most attractive place for marketer penetration and revenue generation. The webtop may provide new applications and insight into what applications other people with similar interests are finding useful. The value of this will be enhanced through other avenues as the user may seek information or content advice from people with similar interests in a social network.

By operating a hypervisor on a computer the computing experience may become more predictable more secure. Employing such actions in instant-on may further enhance security. For example, the instant-on may require a thumbprint authorization at boot, by way of non-limiting example only. Operating a hypervisor with specialized core services in parallel with the first operating system may thus allow for design and maximization of secure functions, including: ad revenue/serving; website direction; computer security; computer stability; increased efficiency; instant-on; battery efficiencies; and direct access to peripheral devices such as DVD player and the like.

According to an aspect of the present invention, the current hypervisor may be configured to provide instant-on capabilities. In such a configuration, a platform, such as LINUX, for example, may be used to provide quick boot capability allowing a user to, instead of waiting while the computer boots up, to quick-boot and check email, instant message, surf the web, play videos, download data, and other common functions, via the hypervisor webtop. Such instant on capability need not contain the ability to perform all types of computing functionality, instead providing a limited subset of functionality that may be designed around those functions that are often the first accessed after boot up. In this way, the boot up process time may be utilized to perform those functions that are initiated upon completion of the boot routine, thereby increasing efficiency and utilizing more fully the computer processing ability. Thus instant-on configuration may enable instant user gratification. Further, it may provide an avenue through which locking startup pages and the like may direct traffic to certain designed sites and links.

Such instant-on technology may be able to boot to the hypervisor webtop in a timeframe of a few seconds, one second, or even at a sub-second level, for example. This instant-on technology may be embedded within the BIOS as described hereinabove, and may be overseen by the hypervisor. This instant-on technology may be designed to mimic that found in other electronic devices, for example.

In light of the discussion herein, those skilled in the art will appreciate the myriad of virtualization capabilities provided by the present invention, particularly in instant-on embodiment. For example, the hypervisor can direct that the hypervisor webtop link, such as via a hypervisor-directed BIOS executed communication link, with a remote server. Thereby, full desktop functionality, with server access and communication, can be provided by the webtop, and can, in instant on embodiments, be instantly provided by the webtop.

A widget in accordance with the present invention, and as will be understood by one of ordinary skill in the art, is a portable portion of code that may be installed or executed within any separate HTML based webpage, such as a webpage displayed by the aforementioned webtop browser, by an end user without necessitating additional compilation of that code portion. Such widget code portions, in accordance with the present invention, are embeddable by the end user. As such, a widget in accordance with the present invention is any code portion that may be embedded by the end user within a selected page of HTML, XML, or like code that causes presentation of that selected web page. The widget, via the embedded code portion, thereby adds non-static content to the subject webpage.

The present invention may include, for presentation in applications, such as web browsers, within or without the aforementioned application space, a fully portable, widgetized avatar having associated therewith multiple items of social information that are generally requested for association with at least two different computing communities or transactions. Widgetization of the avatar of the present invention necessarily allows for portability of the avatar of the present invention, such as between or among multiple social sites. Further, a myriad of additional information may be associated with the avatar, wherein such information is generally required or desired for use in computing communities or transactions. This information may be organized into multiple levels of detail, and/or multiple levels of accessibility to third parties in a computing community or transaction, and may include likes or dislikes, such as musical or motion picture tastes, job or educational status, age, location, income, marital status, and other computed communities with which that user is associated, associated with his or her avatar.

Needless to say, the computing code that provides for the virtual manifestation may be provided in such a normalized format that it is easily adopted into multiple computing communities, across multiple of the aforementioned operating systems, and/or may be adopted as non-static content onto multiple different web pages. As such, the subject avatar may be incorporated into any social communities, fantasy sports communities, blogs, and the like, simultaneously. Further, avatars of particular interest to the general public, such as trading card avatars of musical artists or other famous persons, may be downloaded or referenced by fans of such famous persons. Such "celebrity" avatars, including in such non-classical formats, may include presentations or allow for interactions with celebrity suggestions or favorites, such as recipes, music, concerts, movies, talk shows, reality shows, or the like, and may further allow for purchases from or related to such suggestions or favorites. As such, preferred presentation of such avatars may be among the premier marketing opportunities discussed hereinabove if employed with a "hard coded" hypervisor application space embodiment. Further, such marketing opportunities may include a tool whereby physical features, clothing, accessories, and activities of an avatar may be taken from the real world and "virtualized" for "hard coded" hypervisor-mandated presentation. As such, virtualized items may be made available for sale for use with an avatar just as the corresponding real items are generally for sale for use with the real world user correspondent to the avatar. Likewise, celebrity avatars may be presented as "model" widgetized avatars, and the user may be enabled to purchase those items worn by the celebrity's avatar, and/or that are endorsed by that celebrity. Additionally, this may allow for an upsell engine that may operate, upon purchase of a virtual item for association with the user's avatar, to present the user with an opportunity to purchase the same or similar article in the real world for real world use by the actual user based on that user's known preference for that article as evidenced by the purchase of the virtual article for use with the user's avatar, or vice versa. The upsell engine may additionally or alternatively include presentation to the user of an advertisement for real world articles that are the same as or associated with the virtual article purchased by the user, or may allow for presentation of advertising related to likely related virtual or real world articles of interest to the user based on the user's expressed preference for the particular virtual article selected.

Further, the present invention may allow for association of particular levels of expertise with particular areas of interest as related to the avatar. Thus, searches may be made available in one or more computing communities for persons having desired levels of expertise in certain areas. Thus, a search by a party in need, such as a key word or wish list search, for an expert or information accumulated by an expert in a particular area may return not a user advertising to be an expert in a particular area, but instead may return a user and/or information objectively adjudged to be expert information in a particular area.

Thus, the avatar of the present invention enables a user to create a portable, fully virtual, "person" for association with that user and carrying the characteristics of that user, including a personal profile and identification card that can be used in combination with any web page, web top or desk top and any computing community, transaction or social networking situation. Thereby, the avatar of the present invention allows users to connect with other users and share ideas, content, expertise, and applications. Further, the avatar of the present invention thus assists in viral growth by offering users of certain or multiple computing communities an avatar that keeps all personal profile information in one transportable place. Additionally, the avatars of the present invention may provide a foundation for a recommendation and expertise engine employing an algorithm that may suggest content or an expert based on a user's community, popularity, known expertise, clicks, interests, searches, or the like.

The present invention, such as the hypervisor webtop, may allow, with or without the use of widgets and/or widgetized avatars, the execution of specialized searches. The search executed may search for a "master" in the area searched, such as a person having some increased level of expertise in the searched area in a particular environment, such as on one or more of the user's social networks, and/or may seek search results in accordance with those results found most useful by such "masters." The social networks of a user, or a master, may be associated, for example, with an avatar.

Needless to say, unlike the aforementioned search types of the present invention, typical keyword search engines are well understood to those of ordinary skill in the art. In the present invention, a hypervisor may allow for a search or wishlist feature to be made available across multiple computing communities, and such a multi-community search engine may, for example, for security purposes, allow a particular user to search only those communities of which that user is a member, and may further allow for such searching in an instant-on environment prior to presentation of aspects of a typical primary operating system with which such searches are usually associated.

In the prior art, subsequent users may, in certain embodiments, access and/or make use of prior searches by prior users of a search engine. However, even in such instances, the subsequent user has no way of knowing of the expertise level of the prior searching user, that is, the subsequent user has no way of knowing if the prior user was an expert, or at least had sufficient expertise to make reusing his or her search worthwhile. Rather, a true expert in a particular area is likely to have record of, such as by book marking, live-linking, or having a page dedicated to, particular links or points of interest that that expert has found helpful. Thus, it is far more useful for the subsequent user to search for an expert or an expert's results, and then make use of the expert's recommended information or search points, than it is for the user who is a non-expert to formulate his or her own search, or reuse a prior search that may or may not have been performed by an expert. Additionally and alternatively, experts in particular fields may advertise their expertise using a hypervisor driven application, such as wherein his or her expertise has been verified by a computing community, and a searching user may search such "advertisements" in order to locate a known expert in a particular field.

Thus, the present invention, at least in part, may provide searching based on the relevancy of a person's expertise to a desired topic on which help is sought, rather than the prior art methodology of keyword searching relating not to people and/or experts, but instead relating merely to websites, things, or advertised services that have no expertise rating associated therewith. Of course, this embodiment of the present invention allows the keyword revenue model of prior art search engines, such as Google®, to be employed in the monetization of searching for true experts that can assist in topical areas, and/or expert information in those topical areas, associated with the particular keywords searched.

Thus, in accordance with the exemplary embodiments set forth herein throughout, the present invention provides an intersection between keywords and expertise in those keywords. As will be apparent to those skilled in the art in light of this discussion, similarities among users increases relevancy for keyword search results, particularly in localized, such as geographic or topical localization, searching, and the advantages gained from this similarity are further heightened when one of the users wishes to gain from the expertise of a similar user in a desired area. Such expertise-based keyword searching is particularly useful in areas in which such unique expertise would generally improve search results, such as in, but not limited to, geographic locality, travel, health, entertainment, cars, lifestyle, education and commerce, for example.

Needless to say, the search capabilities of the present invention may be employed in conjunction with more typical prior art search capabilities, such as a web crawler, to increase the richness of the search results produced. In such an exemplary embodiment, the results of the present invention and a prior art type search may be presented to the user seamlessly and simultaneously, or may be produced separately to allow the user to assess which methodology has produced the most relevant results. Those skilled in the art will understand that, in the event a searching user is allowed to select between the results of multiple different search types, the type ultimately selected should be indicative of which search method produced the more relevant results. Thereby, tracking which result set is selected by the searching user may be algorithmically employed by the present invention in order to further improve the search results produced by the present invention.

Further, the present invention may include a widget constituting a discreet portion of a favored user experience that may be applied to a desktop, web top and/or the aforementioned hypervisor webtop experience to personalize such a desktop or web top experience to that particular user. Further, such widgets in the present invention may allow for transport of a favored user experience to other user experience locations, such as computing communities and/or social networking sites, in order to improve that user's experience of such other sites or network locations. Needless to say, as used herein a network or network experience is and includes an internet, intranet, extranet, telecommunications network, and any other network experience that allows for importation of the widget concept.

Additionally, for example, as will be understood by those skilled in the art in light of the discussion herein, in embodiments wherein the certain characteristics of a user are known to the search engine of the present invention, the downloading of widgets in accordance with the present invention allows for a monitoring of who performed a search, what they deemed most relevant responsive to it, and what was done responsive to that relevance, such as the downloading of a widget.

Further, discretely or in association with the aforementioned tracking of widgets, the use of particular widgets may allow for monetization, such as advertising monetization, to be associated with the user of the subject widget, such as by allowing for the presentation to the user of particular advertisements, such as from an advertising server, based on the user's use or download a particular widget. Further, such advertising may be directly associated by the publisher of the subject widget for presentation to the user of the subject widget at predetermined times, or upon predetermined uses of the subject widget.

For example, either through the aforementioned webtop, or via a prior art desktop or webtop, users may be provided the capability to create their own content rich widgets, which may be, in whole or in part, sponsored by advertisers. These widgets may, for example, have click through capability to purchase the sponsored product.

Additionally, the webtop discussed herein throughout may include multiple search options, such as those discussed herein throughout, and/or multiple search engines, or may present different search options based on any number of factors, such as user characteristics, such as age or income, user preferences, and/or user geographic location. Thereby, monetization from search engine providers may be provided by allowing for the use of different search engines on different devices employing the referenced webtop, i.e. search engine 1 on cell phones and search engine 2 on the Internet, and/or the use of different search engines by users in different geographic locations.

Further, the present invention may allow for the presentation of original content, and/or the licensing of third party content and/or content presentation methodologies. Thereby, the present invention allows for a monetization event in capitalizing on advertising revenue when such original and/or licensed content is viewed, such as by a user of the aforementioned webtop.

The present invention may allow, with or without the use of widgets and/or widgetized avatars, the execution of specialized searches. For example, a user may execute a search. The search executed may search for a "master" in the area searched, such as a person having some increased level of expertise in the searched area in a particular environment, such as on one or more of the user's social networks, and/or may seek search results in accordance with those results found most useful by such "masters." The social networks of a user, or a master, may be associated, for example, with an avatar.

Those skilled in the art will understand that such virtualized manifestations, widgets, and even searches may be provided in a normalized format such that it is easily adopted into multiple computing communities, and/or may be adopted as non-static content onto multiple different web pages. As such, for example, a subject virtual manifestation may be incorporated, responsive to a search, into the search results for multiple social communities, fantasy sports communities, blogs, and the like. Further, virtual manifestations of particular interest to the general public, such as those of musical artists, other famous persons, or "hot" search terms, may be have widgets associated with such virtual manifestations downloaded, added to user hot pages, or otherwise referenced by fans of such famous persons. As will be understood by those skilled in the art in light of the discussion herein, and in part due to the fact the certain characteristics of the searching user may be known to the search engine of the present invention, the downloading of widgets in accordance with the present invention allows for a monitoring of who performed a search, what they deemed most relevant responsive to it, and what was done responsive to that relevance, such as the downloading of a widget. Thereby, the present invention may include an advanced marketing and sales tool.

Needless to say, typical keyword search engines are understood to those of ordinary skill in the art. Such an engine may be available in a particular computing community, or a search feature may be made available across multiple computing communities, and such a multi-community search engine may, for example, for security purposes, allow a particular user to search only those communities of which that user is a member. Keywords may be entered by a searching user in freehand, or a list of available keywords for expertise searching may be presented to the user for selection of a particular keyword or keywords.

Other categories, such as photos, videos, blogs and the like related to the search keywords may also be categorically presented, for ease of locating by the searching user, and in fact may include presentation of snapshots, thumbnails, mouse-overs or the like to allow a user to assess relevance or desirability from the results page, and without actually entering the presented link. The feeds presented may be, for example, RSS feeds, YouTube feeds, or the like. Further, as was the case with the links presented hereinabove, the searching user may edit, upload, tag, change, or recommend any picture or video box. Needless to say, the search capabilities of the present invention may be employed in conjunction with more typical prior art search capabilities, such as a web crawler. In such an exemplary embodiment, the results of the present invention and a prior art type search may be presented to the user seamlessly and simultaneously, or may be produced separately to allow the user to assess which methodology has produced the most relevant results. Those skilled in the art will understand that, in the event a searching user is allowed to select between the results of multiple different search types, the type ultimately selected should be indicative of which search method produced the more relevant results. Thereby, tracking which result set is selected by the searching user may be algorithmically employed by the present invention in order to further improve the search results produced by the present invention.

One way in which improved search results may be used is in conjunction with a web crawler designed to seek information related to a specific subject or subjects. In one aspect of the present invention, a search may focus on seeking information contained in existing social networks. The search may be based on a query of a single object and/or multiple objects gathered from the user's existing database of objects. Objects may include names of files/folders, previously used search terms and/or contacts, for example. The present invention may build a query from the available objects and seek out, for example, social networking sites to retrieve information relevant to the objects. The amount of information may further be controlled by delimiting the level of relevance the crawled information has to any particular object during a given search.

By way of non-limiting example only, a user may have a collection of personal contact objects and may wish to cull together postings by those objects. Using the techniques describe more thoroughly above, the search may perform deep searches over social networks such as, for example, Bebo, Blogger, DailyMotion, DeviantArt, Digg, Delicious, Facebook, Flickr, Fotolog, Friendster, HI5, ImageStation, Imeem, Last.fm, LiveJournal, MySpace, Netlog, Photobucket, Vox, Webshots, Windows Live Spaces, Wretch, Xanga, Yahoo Video, and YouTube. The searching may include, for example, use of the social website's API which may allow for user searching based on, for example, email address. The information collected may be user defined, but may include links or full and/or partial pieces of the object's posting(s) to each site searched. Thus, the returned results allows the user of the present invention to see, for example, the postings of each of their selected contacts to the social networking sites for which their contact is a member and/or has placed a post. The returned information may be linked to a widget(s) and be associated with an avatar or simply displayed in a typical search results page for access by the user.

Additionally, the search conducted may be saved and refreshed on a "real time" basis. Thus, as objects appear, or in this case as contacts post information, the search results will automatically reflect the newly available search information, such as newly available RSS feeds, for example. By way of further example, a contact may post a desired gift item to his/her "wish list" on Amazon.com. This posting may then be made available to the search results after a successful crawl of the contact's sites. Crawling frequency may be continuous and/or limited by the user and may be made more efficient by crawling only these sites known to be used by the contact. Such abreviated crawling tailored to a specific contact may be user defined and may occur in a greater ratio than an unlimited crawl to increase the efficiency of the crawling without, for example, eliminating the ability to see previously unknown social networking links by a contact. The user may, of course, control the ratio of frequency of each aspect of the searching and crawling.

Although the invention has been described and pictured in an exemplary form with a certain degree of particularity, it is understood that the present disclosure of the exemplary form has been made by way of example, and that numerous changes in the details of construction and combination and arrangement of parts and steps may be made without departing from the spirit and scope of the invention.

What is claimed is:

1. A computer based method for displaying search information, the steps comprising:
   providing a computer;
   wherein said computer has a display;
   providing a one or more networked social websites;
   wherein said one or more networked social websites are accessible to said computer;
   providing a search engine software program that searches said one or more networked social websites;
   providing a digital widgetized avatar representative of a user that represents said user within said one or more networked social websites;
   performing, via said search engine software program, a search of said one or more networked social websites by said user;
   providing a search results information from said search performed of said one or more networked social websites;
   wherein said search results information includes one or more pieces of information related to one or more contacts of said user from said one or more networked social websites;
   providing a crawler software program;
   wherein said crawler software program crawls each of said one or more networked social websites for one or more modifications to said search results information, wherein a modified search results is returned;
   wherein said user controls a ratio of frequency of said searching and said crawling steps;
   displaying said modified search results on said display.

2. The computer based method for displaying search information of claim 1, wherein said digital widgetized avatar representative is portable to one or more others users of the one or more networked social websites.

3. The computer based method for displaying search information claim 1, wherein said digital widgetized avatar representative comprises a secondary information.

4. The computer based method for displaying search information of claim 3, wherein said secondary information is organized in multiple levels of detail.

5. The computer based method for displaying search information of claim 3, wherein said secondary information includes like and dislikes.

6. The computer based method for displaying search information of claim 1, further comprising providing a market for purchasing one or more virtualized items for use with said digital widgetized avatar representative.

7. The computer based method for displaying search information of claim 6, wherein said market comprises an upsell engine software program.

8. The computer based method for displaying search information of claim 1, wherein said digital widgetized avatar representative comprises a virtual person.

9. The computer based method for displaying search information of claim 1, wherein said digital widgetized avatar representative comprises one or more characteristics of said user.

10. The computer based method for displaying search information of claim 1, wherein said digital widgetized avatar representative comprises a personal profile information.

11. The computer based method for displaying search information of claim 1, wherein said digital widgetized avatar representative comprises a foundation for an engine software program for recommending a plurality of content.

12. The computer based method for displaying search information of claim 1, wherein said modified search results are comprised of one or more expert results.

13. The computer based method for displaying search information of claim 12, wherein said expert results are verified by at least one of the networked social websites.

14. The computer based method for displaying search information of claim 1, wherein said computer further comprises a monetization engine software program.

15. The computer based method for displaying search information of claim 14, wherein said monetization engine software program comprises one or more advertisements.

16. The computer based method for displaying search information of claim 15, wherein said one or more advertisements are associated by a publisher for presentation at predetermined times.

17. The computer based method for displaying search information of claim 1, wherein said modified search results is comprised of one or more keywords and an expertise in keywords.

18. The computer based method for displaying search information of claim 1, wherein said digital widgetized avatar representative comprises one or more ratings.

19. The computer based method for displaying search information of claim 1, wherein said crawler software program conducts a prior art search.

20. The computer based method for displaying search information of claim 1, wherein said modified search results are based on a query of a single object.

21. The computer based method for displaying search information of claim 20, wherein the single object includes at least one object selected from the group of objects consisting of a file, a folder, a previous search term, and a contact.

22. The computer based method for displaying search information of claim 1, wherein said software program includes delimiting a level of relevance of said search results information that are crawled by said crawler.

23. The computer based method for displaying search information of claim 1, wherein said crawler operates on a real time basis.

24. The computer based method for displaying search information of claim 1, wherein said crawler operates continuously.

25. The computer based method for displaying search information of claim 1, wherein said crawler has a limited operation.

26. The computer based method for displaying search information of claim 25, wherein said limited operation is tailored to a specific contact.

27. A computer-based method of performing searches in association with one or more networked social websites, comprising:
   providing a computer;
   wherein said computer has a display;
   providing a one or more networked social websites;
   wherein said one or more networked social websites are accessible to said computer;
   providing a digital widgetized avatar representative of a user that represents said user within said one or more networked social websites that are used by said user;
   wherein said user has a plurality of contacts with said one or more networked social websites;
   providing a crawler software program;
   wherein said crawler software program crawls each of said one or more networked social websites for one or more modifications to said plurality of contacts, such that a plurality of search results are created;
   wherein said user controls a ratio of frequency of said searching and said crawling steps;
   displaying said plurality of search results on said display.

28. The computer-based method of claim 27, further comprising: transporting said digital widgetized avatar representative to at least a third networked social website.

29. The method of claim 27, further comprising providing for purchasing a plurality of virtualized items for use with said digital widgetized avatar representative.

30. The computer-based method of claim 29, wherein said step of providing for purchasing comprises upselling.

31. The computer-based method of claim 27, wherein the digital widgetized avatar representative comprises a plurality of characteristics of said user.

32. The computer-based method of claim 27, wherein the digital widgetized avatar representative comprises a plurality of personal profile information of said user.

33. The computer-based method of claim 27, further comprising recommending a content of said plurality of search results displayed on said displayed.

34. The computer-based method of claim 27, wherein said plurality of search results displayed on said display are optimized by a monetization engine software program.

35. The computer-based method of claim 34, wherein said plurality of search results displayed includes one or more advertisements.

36. The computer-based method of claim 27, wherein said plurality of search results is based on a query of at least one query selected from the group consisting of a file, a folder, a previous search term, and a contact.

37. The computer-based method of claim 27, further comprising delimiting a relevance of the plurality of search results.

* * * * *